US012654789B2

(12) United States Patent
Rowa

(10) Patent No.: US 12,654,789 B2
(45) Date of Patent: Jun. 16, 2026

(54) FASTENING ARRANGEMENT OF A DRIVE WHEEL MEMBER FOR AN ENDLESS TRACK OF A TRACKED VEHICLE

(71) Applicant: BAE Systems Hägglunds Aktiebolag, Örnsköldsvik (SE)

(72) Inventor: Andreas Rowa, Bonässund (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 497 days.

(21) Appl. No.: 18/030,915

(22) PCT Filed: Oct. 7, 2021

(86) PCT No.: PCT/SE2021/050984
§ 371 (c)(1),
(2) Date: Apr. 7, 2023

(87) PCT Pub. No.: WO2022/081065
PCT Pub. Date: Apr. 21, 2022

(65) Prior Publication Data
US 2023/0365205 A1 Nov. 16, 2023

(30) Foreign Application Priority Data

Oct. 13, 2020 (SE) .................................... 2051187-9

(51) Int. Cl.
*B62D 55/13* (2006.01)
*B62D 55/32* (2006.01)
(52) U.S. Cl.
CPC ............. *B62D 55/13* (2013.01); *B62D 55/32* (2013.01)
(58) Field of Classification Search
CPC ....... B62D 55/12; B62D 55/125; B62D 55/13
See application file for complete search history.

(56) References Cited

U.S. PATENT DOCUMENTS 1,921,329 A 8/1933 Smoot
2,534,187 A 12/1950 Urban
(Continued)

FOREIGN PATENT DOCUMENTS

CN 209581652 U 11/2019
CN 212580017 U 2/2021
(Continued)

OTHER PUBLICATIONS

International Search Report and Written Opinion mailed Oct. 21, 2021, directed to International Application No. PCT/SE2021/050984; 12 pages.
(Continued)

*Primary Examiner* — Jason R Bellinger
(74) *Attorney, Agent, or Firm* — Morrison & Foerster LLP

(57) ABSTRACT

Disclosed is a fastening arrangement of a drive wheel member for an endless track of a tracked vehicle. The drive wheel member includes a hub member and a drive sprocket member, wherein the drive sprocket member includes a set of tooth members arranged around the circumference of the drive sprocket member. The drive sprocket member also includes a ring-shaped support member for tooth members of the drive sprocket member. The fastening arrangement is configured for fastening a tooth member of the set of tooth members to the support member so that the tooth member is in an operation position for engaging with the endless track, wherein the fastening arrangement includes an attachment device configured to detachably attach the tooth member to the support member such that the tooth member is detached from the operation position if the tooth member is subjected to a radial force exceeding a certain threshold.

17 Claims, 10 Drawing Sheets

(56)                    References Cited

U.S. PATENT DOCUMENTS

|  |  |  |  |  |
|---|---|---|---|---|
| 4,881,930 | A | 11/1989 | Oertley | |
| 5,190,363 | A | 3/1993 | Brittain et al. | |
| 11,814,119 | B2 * | 11/2023 | Westberg | B62D 55/32 |
| 12,202,557 | B2 * | 1/2025 | Söderström | B62D 55/135 |
| 2004/0145239 | A1 | 7/2004 | Deckler et al. | |
| 2009/0085399 | A1 | 4/2009 | Moyna | |
| 2009/0321151 | A1 | 12/2009 | Archambault et al. | |
| 2022/0250695 | A1 * | 8/2022 | Söderström | F16H 55/12 |
| 2025/0229854 | A1 * | 7/2025 | Strömberg | B62D 55/0885 |

FOREIGN PATENT DOCUMENTS

|  |  |  |  |
|---|---|---|---|
| EP | 0831017 | A1 | 3/1998 |
| JP | 2015-182547 | A | 10/2015 |
| WO | 2019/015816 | A1 | 1/2019 |
| WO | 2020/246936 | A1 | 12/2020 |

OTHER PUBLICATIONS

Office Action and Search Report dated Jun. 27, 2023, directed to SE Application No. 2251324-6; 6 pages.

Office Action and Search Report dated Jun. 3, 2021, directed to SE Application No. 2051187-9; 9 pages.

Extended European Search Report dated Oct. 4, 2024, directed to EP Application No. 21880666.9; 6 pages.

* cited by examiner

B-B

D-D

A-A

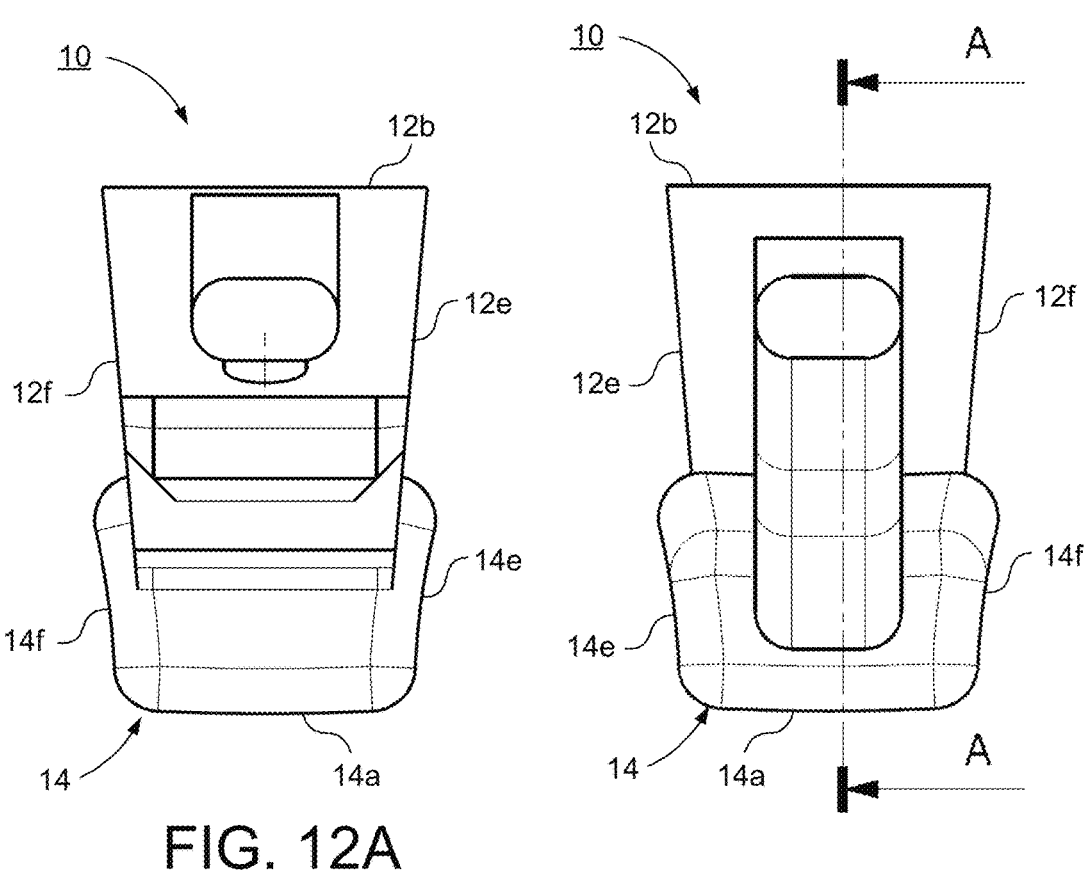
FIG. 12A
FIG. 12B
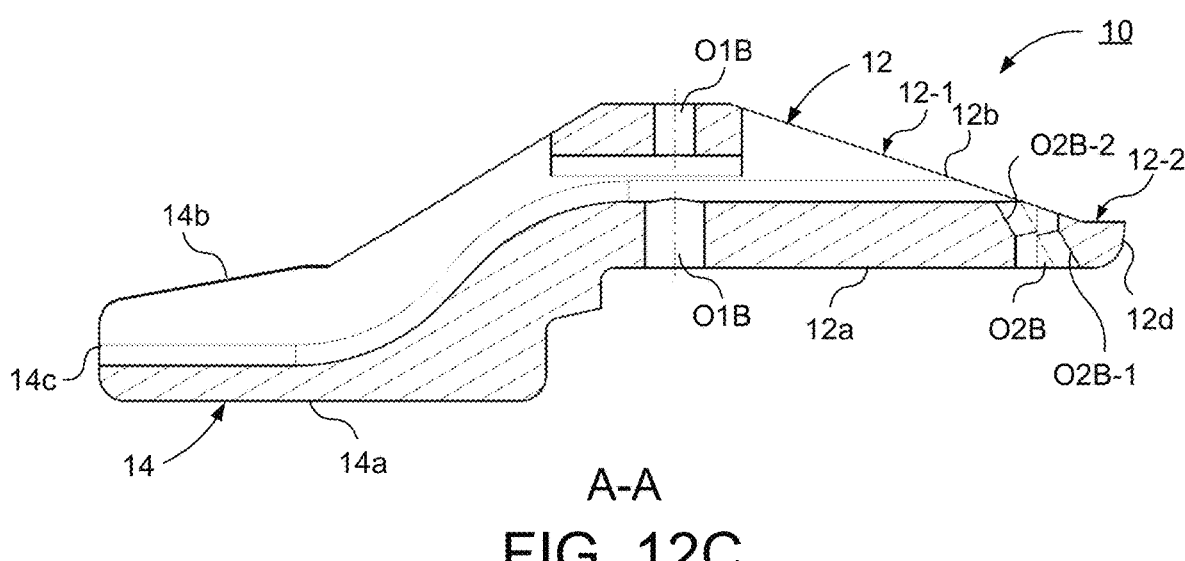
A-A
FIG. 12C

FASTENING ARRANGEMENT OF A DRIVE WHEEL MEMBER FOR AN ENDLESS TRACK OF A TRACKED VEHICLE

CROSS-REFERENCE TO RELATED APPLICATIONS

This application is a U.S. national stage application under 35 U.S.C. § 371 of International Application No. PCT/SE2021/050984, filed Oct. 7, 2021, which claims the priority of SE Application No. 2051187-9, filed Oct. 13, 2020, the entire contents of each priority application of which is incorporated herein by reference.

FIELD OF THE DISCLOSURE

The present invention relates to fastening arrangement of a drive wheel member for an endless track of a tracked vehicle. The present invention also relates to a drive wheel member having such an arrangement. The present invention also relates to a tracked vehicle comprising drive wheel members having such an arrangement.

BACKGROUND OF THE DISCLOSURE

Tracked vehicles may be equipped with opposite track assemblies. Each track assembly comprises an endless track arranged to run over a set of wheels comprising a drive wheel member, a tension wheel and a set of road wheels there between.

A drive wheel member may be equipped with a hub member and an inner drive sprocket member and an outer drive sprocket member connected to the respective side of the hub member.

Such tracked vehicles, e.g. combat vehicles, are intended to be driven in rough terrain. A problem during drive in rough terrain with such vehicles, in particular in connection to reversing and turning, is that ingestion of undesired material such as gravel and stones into the respective track assembly and in between wheels, in particular drive wheel members, and the endless track may occur, which in turn cause damages to the tracked vehicle, comprising damages to drive wheel member and tracks, and may in some cases result in the endless track being torn apart.

Further, wear on drive wheel members may be relatively large. When using endless tracks of rubber, exchange of drive wheel members needs to be performed in a workstation, where each drive sprocket member of the drive wheel member needs to be removed.

There is a need for providing a fastening arrangement of a drive wheel member for an endless track, which further facilitates reducing such damages and facilitates maintenance.

OBJECTS OF THE INVENTION

An object of the present invention is to provide fastening arrangement of a drive wheel member for an endless track of a tracked vehicle, which facilitates reducing/preventing damages to endless tracks and drive wheel member.

A further object of the present invention is to provide fastening arrangement of a drive wheel member for an endless track of a tracked vehicle, which facilitates maintenance of the drive wheel member.

A further object of the present invention is to provide a drive wheel member comprising such an arrangement.

A further object of the present invention is to provide a vehicle comprising such an arrangement.

SUMMARY OF THE DISCLOSURE

These and other objects, apparent from the following description, are achieved by a fastening arrangement, a drive wheel member and a vehicle, as set out in the appended independent claims. Preferred embodiments of the fastening arrangement are defined in appended dependent claims.

According to the invention the objects are achieved by a fastening arrangement of a drive wheel member for an endless track of a tracked vehicle. The drive wheel member is rotatable about a centre axis for rotating said endless track. Said drive wheel member comprises a hub member and a drive sprocket member. Said drive sprocket member comprises a set of tooth members arranged around the circumference of said drive sprocket member, said tooth members being configured to engage with said endless track. Said drive sprocket member further comprises a ring-shaped support member for tooth members of said drive sprocket member. Said tooth members are configured to be removably attachable to said support member. Said fastening arrangement is configured for fastening a tooth member of the set of tooth members to the support member so that said tooth member is in an operation position for engaging with said endless track. Said fastening arrangement comprises an attachment device configured to detachably attach said tooth member to said support member such that said tooth member is detached from the operation position if said tooth member is subjected to a radial force exceeding a certain threshold. According to an aspect of the present disclosure the radial force is directed radially towards the centre axis.

Hereby the damages to the endless track and tooth members due to ingestion of undesired material such as gravel and stones in between drive wheel member and endless track may be efficiently reduced. By thus detachably attach said tooth member to said support member such that said tooth member is detached from the operation position if said tooth member is subjected to a radial force exceeding a certain threshold the risk of damages to the endless track comprising risk of endless track being torn apart may be efficiently reduced. Hereby damages to longitudinally extending wires through endless track of e.g. rubber material may be efficiently reduced, which in turn reduces the risk of the endless track being torn apart. Such wires may e.g. be steel wires or wires of other suitable material. Further, easy and efficient maintenance of the drive wheel member is facilitated in that tooth members may be easily and efficiently exchanged and easily and efficiently attached to the support member. Thus, exchange and reassembling of tooth members of a drive sprocket member of a drive wheel member is facilitated with such a fastening arrangement.

According to an aspect of the present disclosure, said attachment device is configured to provide a radially arranged attachment between said tooth member and said support member in said operation position, wherein said attachment device is configured to detachably attach said tooth member to said support member such that said tooth member is detached from the operation position if said tooth member is subjected to said radial force exceeding said certain threshold, said radial force being directed towards the centre axis.

According to an embodiment of the fastening arrangement, said ring-shaped support member has an outer side configured to face the endless track of the tracked vehicle when the drive wheel member is mounted to the tracked vehicle and an opposite inner side, wherein said tooth member comprises a connection portion configured to be arranged in connection to said inner side of said support member and an engagement portion configured to project from the ring-shaped support member so as to engage with said endless track in said operation position. Said endless track is configured to run over said drive wheel member when the drive wheel member is mounted to the tracked vehicle. Said endless track has an outer side facing away from the drive wheel member when the track is engaging with the drive wheel member, i.e. engaging with said tooth members, and an inner side facing towards the drive wheel member when the track is engaging with the drive wheel member so that said tooth members are engaging with said inner side of the endless track. Said outer side of said support member is configured to face in the radial direction of said support member away from said centre axis and the inner side of said support member is configured to face in the radial direction towards said centre axis.

According to an embodiment of the fastening arrangement, said ring-shaped support member has a first end side and an opposite second end side, said end sides facing in a direction parallel to the direction of said centre axis, wherein said engagement portion is configured to project from the first end side in a direction essentially parallel to the direction of the centre axis so as to engage with said endless track in said operation position. According to an aspect of the present disclosure, said engagement portion is configured to project from the first end side in a direction essentially parallel to the direction of the centre axis so as to facilitate said detachment of said tooth member from the operation position if said tooth member is subjected to a radial force exceeding a certain threshold. According to an aspect of the present disclosure, said engagement portion is configured to project relative to the ring-shaped support member in a radial direction away from said axial direction of said centre axis so that a radial outer side of said engagement portion is at a radial distance from said centre axis which is greater than the radial distance of the radial outer side of said support member so as to facilitate said engagement with said endless track in said operation position.

According to an embodiment the fastening arrangement comprises a recess arranged on said inner side of said ring-shaped support member and configured to run between said first end side and said opposite second end side, said connection portion of said tooth member being configured to be closely received in connection to said recess in said operation position. Hereby efficient assembly of tooth member is facilitated. According to an aspect of the present disclosure, said recess is arranged on the radial inner side of said ring-shaped support member facing in the radial direction towards said centre axis. According to an aspect of the present disclosure, said recess, arranged on the radial inner side of said ring-shaped support member, has a recess bottom facing in the radial direction towards said centre axis.

According to an embodiment of the fastening arrangement, said attachment device comprises a fastener configured to connect said tooth member to said support member in said operation position, said fastener being configured to provide a resistance force such that said tooth member remains attached in said operation position if said tooth member is subjected to a radial force not exceeding said certain threshold, and such that said tooth member is detached from the operation position if subjected to said radial force exceeding said certain threshold. Hereby efficient control of the desired resistance for holding the tooth member in the operation position may be provided in that a predetermined threshold at which the tooth member is detached may be set if said radial force exceeds said threshold. According to an aspect of the present disclosure, said fastener is configured to have an extension in the radial direction in connection to said support member so as to provide said radially arranged attachment in the operation position. Such a radially arranged attachment facilitates controlled detachment based on said predetermined threshold. Said fastener may e.g. be any suitable screw joint member. According to an aspect of the present disclosure, said fastener of said attachment device has a projection portion configured to project, through a radially extending opening, from the bottom of said recess, and configured to be received in and connected to an opening of said connection portion of said tooth member when said tooth member is in the operation position such that if said tooth member is subjected to said radial force exceeding said certain threshold, said tooth member is allowed to detach from said projection portion.

According to an embodiment of the fastening arrangement, said tooth member is configured to be detainably arranged such that, if said tooth member is subjected to a radial force exceeding a certain threshold resulting in said detachment from the operation position, said tooth member is detained in connection to said support member. Hereby, if a tooth member is detached from the operation position, the tooth member will not fall off, but will remain in connection to the support member and hence drive wheel member. Hereby a thus detached tooth member may be re-used, and thus re-assembled to the support member of the drive wheel member.

According to an embodiment of the fastening arrangement, said fastening arrangement further comprises a detaining device configured to detain said tooth member if said tooth member is subjected to a radial force exceeding a certain threshold resulting in said detachment from the operation position. Hereby efficient detaining such that avoidance of a tooth member falling off from the drive wheel member when subjected to such a radial force may be facilitated.

According to an embodiment of the fastening arrangement, said detaining device is configured to movably connect said tooth member to said support member such that if said tooth member is subjected to a radial force exceeding a certain threshold, said tooth member is tiltably moved in the radial direction. By thus allowing such tiltable movement of said tooth member by means of a detaining device, a combination of efficient detachment of the tooth member from the operation position when said tooth member is subjected to a radial force exceeding a certain threshold and efficient detaining of the tooth member at the support member in connection to said detachment is hereby facilitated.

According to an embodiment of the fastening arrangement, said fastener of said attachment device is configured to attach said connection portion of said tooth member to the recess of said support member in connection to said first end side, said recess being open in the radial direction towards said centre axis in connection to the first end side and at least a certain portion along the way from the first end side towards the second end side such that said tooth member is allowed to detach from the operation position if subjected to said radial force exceeding said certain threshold. By thus utilizing said recess, efficient assembly of said tooth member and efficient locking of said tooth member in said operation position is facilitated.

According to an embodiment of the fastening arrangement, said detaining device is configured to detain said connection portion of said tooth member in connection to said second end side, such that if said tooth member is subjected to said radial force exceeding said certain threshold, said tooth member is tiltably moved in the radial direction from said operation position so that the tooth member is positioned with a certain angle relative to the direction of the centre axis. Hereby efficient detaining of a tooth member when subjected to such a radial force is facilitated. Hereby efficient tiltable movement of said tooth member is facilitated whereby said combination of efficient detachment of the tooth member from the operation position when said tooth member is subjected to a radial force exceeding a certain threshold and efficient detaining of the tooth member at the support member in connection to said detachment is further facilitated.

According to an embodiment of the fastening arrangement, said detaining device comprises a detaining member comprising a second end side opening in connection to said second end side and a stop portion provided by said opening, said second end side opening being arranged in connection to and providing an extension of said recess, said second end side opening being arranged to receive a detaining portion of said connection portion, said stop portion preventing movement of said received detaining portion in the radial direction towards the centre axis. Hereby efficient tiltable movement of said tooth member is facilitated whereby said combination of efficient detachment of the tooth member from the operation position when said tooth member is subjected to a radial force exceeding a certain threshold and efficient detaining of the tooth member at the support member in connection to said detachment is further facilitated.

According to an embodiment of the fastening arrangement, said detaining device is configured to detain said connection portion of said tooth member in connection to said second end side, such that if said tooth member is subjected to said radial force exceeding said certain threshold, said tooth member is tiltably moved in the radial direction from said operation position to a position in which said connection portion is at least partly received within said recess so that the tooth member is essentially prevented to move in the direction orthogonal to the radial direction and orthogonal to the direction of the centre axis. Hereby efficient detaining of a tooth member when subjected to such a radial force is further facilitated.

According to an embodiment of the fastening arrangement, said detaining device comprises a connection member having a projection portion configured to project from the bottom of said recess in the radial direction in connection to said second end side, said detaining device further comprising an opening arranged in said connection portion of said tooth member, said projection portion being configured to be received in said opening when said tooth member is in the operation position, said opening being dimensioned and configured to be engaged with said projection portion such that if said tooth member is subjected to said radial force exceeding said certain threshold, said tooth member is allowed to pivotably move in the radial direction in connection to said opening from a position essentially parallel to the centre axis to a position with a certain angle relative to the direction of the centre axis. Hereby efficient detaining of a tooth member is further facilitated. Hereby efficient tilting of the tooth member when subjected to a radial force exceeding a certain threshold is further facilitated.

According to an embodiment of the fastening arrangement, said projection portion is configured to essentially prevent movement of said tooth member in the direction of the centre axis. Hereby efficient detaining of a tooth member is further facilitated.

According to an embodiment of the fastening arrangement, said stop portion has an angled surface portion configured to face towards said connection portion such that if said tooth member is subjected to a radial force exceeding a certain threshold, said tooth member is allowed to tiltably move in the radial direction to an angled position where said connection portion is stopped towards said angled surface portion of said stop portion. Hereby efficient detaining of a tooth member when subjected to such a radial force is further facilitated. Hereby efficient and controllable tiltable movement of said tooth member is facilitated whereby said combination of efficient detachment of the tooth member from the operation position when said tooth member is subjected to a radial force exceeding a certain threshold and efficient detaining of the tooth member at the support member in connection to said detachment is further facilitated.

According to an embodiment of the fastening arrangement, said drive wheel member comprises an outer drive sprocket member arranged on the outer side of the hub member and an inner drive sprocket member arranged on the inner side of the hub member, the outer side facing out from a vehicle in the transversal direction of the vehicle and the inner side facing towards the vehicle in the transversal direction of the vehicle to which the drive wheel member is mounted.

According to the invention the objects are achieved by a drive wheel member comprising fastening arrangement as set out herein.

According to the invention the objects are achieved by a tracked vehicle comprising a fastening arrangement as set out herein.

BRIEF DESCRIPTION OF THE FIGURES

For a better understanding of the present disclosure reference is made to the following detailed description when read in conjunction with the accompanying drawings, wherein like reference characters refer to like parts throughout the several views, and in which:

FIG. 12A schematically illustrates a front view of the tooth member in FIG. 11A according to an embodiment of the present disclosure;

FIG. 12B schematically illustrates a rear view of the tooth member in FIG. 11A according to an embodiment of the present disclosure; and FIG. 12C schematically illustrates a cross sectional side view of the tooth member in FIG. 12B according to an embodiment of the present disclosure.

DETAILED DESCRIPTION OF THE DISCLOSURE

Figures 1, 2:
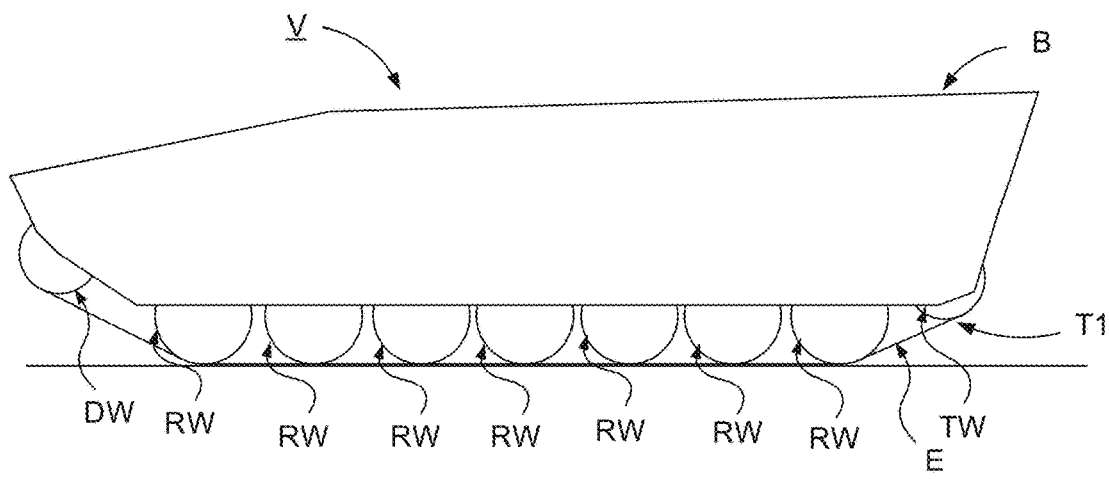
FIG. 1 schematically illustrates a side view of a tracked vehicle according to an embodiment of the present disclosure.
FIG. 2 schematically illustrates a perspective view of a portion of a tracked vehicle with drive wheel member and portion of the endless track of a track assembly according to an embodiment of the present disclosure.

Herein the term "rubber" in relation to "rubber track" refers to any elastic material such as rubber, elastomers or combinations of rubber and elastomers.

According to an aspect of the present disclosure a fastening arrangement of a drive wheel member for an endless track of a tracked vehicle is provided. The fastening arrangement is a fastening arrangement for facilitating preventing damages to the endless track and drive wheel member. The fastening arrangement is according to an aspect of the present disclosure a fastening arrangement for facilitating maintenance of the drive wheel member. The fastening arrangement is according to an aspect of the present disclosure a fastening arrangement for facilitating exchange and reassembling of tooth members of a drive sprocket member of the drive wheel member.

Such a tracked vehicle may comprise a right track assembly and a left track assembly for driving the vehicle. Each track assembly may comprise a drive wheel member, a tension wheel, a set of road wheels and an endless track arranged to run over said wheels, i.e. surround said wheels. The endless track of the respective track assembly may be arranged to be driven and hence rotated by means of said drive wheel member. The tracked vehicle may comprise drive means for driving said drive wheel members. The drive means may be any suitable drive means such as one or more internal combustion engines and/or one or more electric machines.

The endless track of the respective track assembly may have any suitable configuration and be of any suitable material. The endless track of the respective track assembly may according to an aspect of the present disclosure be a rubber track. The endless track of the respective track assembly may according to an aspect of the present disclosure be a steel track.

The drive wheel member comprises a hub member and a drive sprocket member. The drive sprocket member is attached to the hub member.

According to an aspect of the present disclosure said drive wheel member comprises an outer drive sprocket member arranged on the outer side of the hub member and an inner drive sprocket member arranged on the inner side of the hub member. The outer side of the hub member is facing out from a vehicle in the transversal direction of the vehicle and the inner side of the hub member is facing towards the vehicle in the transversal direction of the vehicle to which the drive wheel member is mounted.

According to an aspect of the present disclosure said hub member has a front side or outer side configured to face out from the side of the vehicle and an opposite rear side or inner side configured to face towards the side of the vehicle when the drive wheel member is mounted to the vehicle, i.e. mounted to the track assembly of the tracked vehicle.

The drive sprocket member comprises a set of tooth members arranged around the circumference of said drive sprocket member. Said tooth members are configured to engage with said endless track. Said drive sprocket member further comprises a ring-shaped support member for tooth members of said drive sprocket member. Said tooth members are configured to be removably attached to said ring-shaped support member.

When said drive wheel member is arranged at the tracked vehicle a set of the tooth members of the drive sprocket member may be engaged with the endless track and another set of the tooth members of the drive sprocket member may be at a rotated position of the drive wheel member so that they are not engaged with the endless track and may thus be removed and exchanged. The drive wheel member may then be rotated to another rotated position of the drive wheel member so that another set of the tooth members of the drive sprocket member is not engaged with the endless track and may thus be removed and exchanged.

FIG. 1 schematically illustrates a side view of a tracked vehicle V according to an embodiment of the present disclosure.

The tracked vehicle V is according to the disclosure in FIG. 1 a military vehicle. The tracked vehicle V is according to the disclosure in FIG. 1 a combat vehicle.

The tracked vehicle V comprises a vehicle body B, which according to an aspect of the present disclosure comprises the chassis of the vehicle V and bodywork.

The tracked vehicle V comprises a right track assembly T1 and a left track assembly for driving the vehicle V, the left track assembly being shown in FIG. 1. Each track assembly has a longitudinal extension and the right track assembly is configured to run in connection to the right side along the longitudinal extension of the vehicle body B of the vehicle V and the left track assembly is configured to run in connection to the left side along the longitudinal extension of the vehicle body B of the vehicle V. Each track assembly comprises a drive wheel member DW, a tension wheel TW, a set of road wheels RW and an endless track E arranged to run over said wheels. Here the drive wheel member DW is arranged in the front, the tension wheel TW is arranged in the back and the road wheels RW are arranged between the drive wheel member DW and the tension wheel TW. The tracked vehicle according to the present disclosure may however have track assemblies with any suitable arrangement of drive wheel member, tension wheel and road wheels. According to an aspect of the present disclosure the tension wheel may be arranged in the front, the drive wheel member arranged in the back and the road wheels arranged there between. According to an aspect, the present disclosure relates to a fastening arrangement of a drive wheel DW for a track assembly.

The endless track E of the respective track assembly is arranged to be driven and hence rotated by means of said drive wheel member DW. The tracked vehicle V comprises a drive means, not shown, for driving said drive wheel members DW. The drive means may be any suitable drive means such as an internal combustion engine and/or an electric machine.

The endless track of the respective track assembly may have any suitable configuration and be of any suitable material. The endless track E of the respective track assembly may, according to an aspect of the present disclosure, be a rubber track. The endless track of the respective track assembly may, according to an aspect of the present disclosure, be a steel track.

Figure 3:
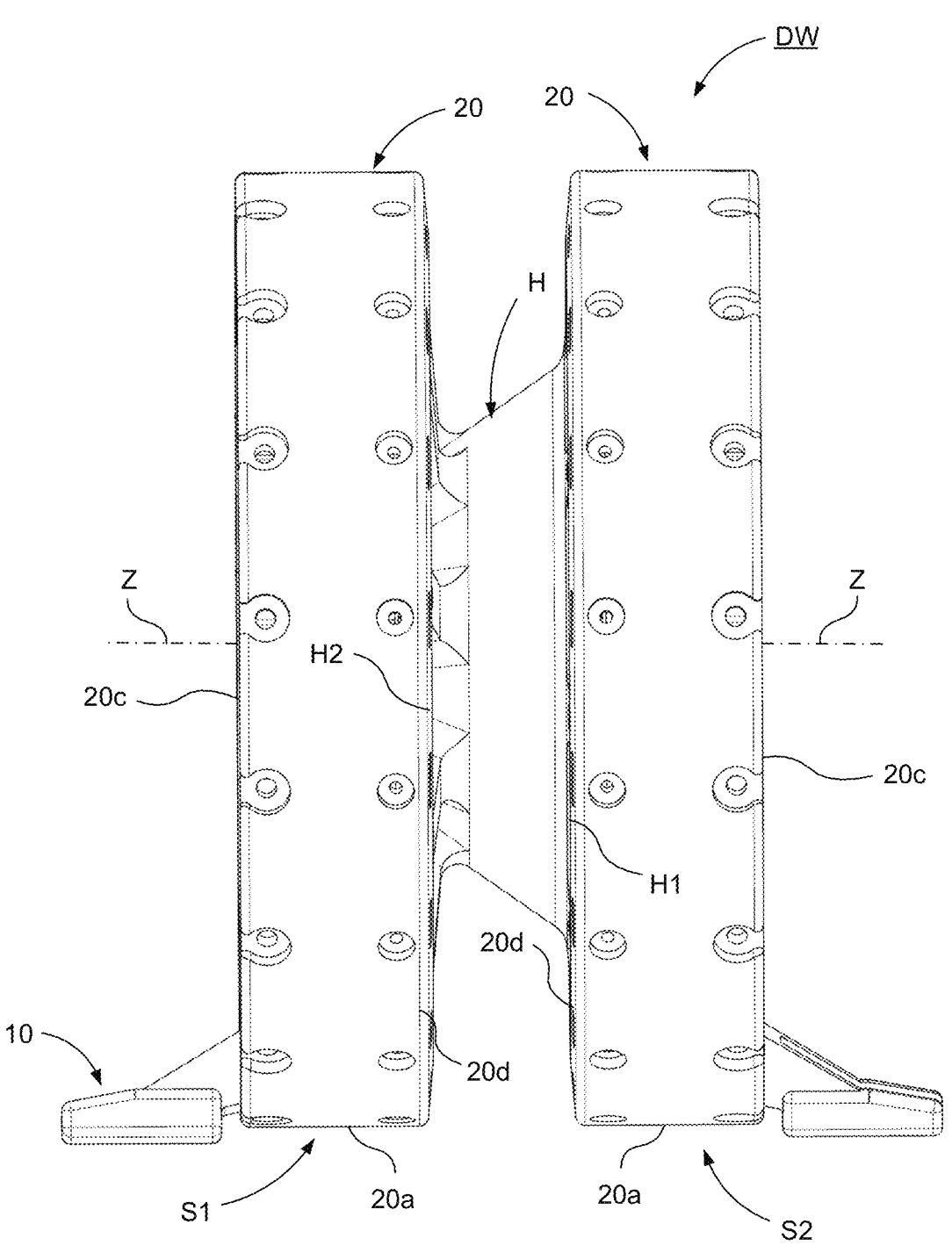
FIG. 3 schematically illustrates a side view of the drive wheel member in FIG. 2 according to an embodiment of the present disclosure.

FIG. 2 schematically illustrates a perspective view of a portion of a tracked vehicle V with drive wheel member DW and portion of the endless track E of a track assembly T1 according to an aspect of the present disclosure. FIG. 3 schematically illustrates a side view of the drive wheel member DW in FIG. 2 according to an aspect of the present disclosure.

The drive wheel member DW has a centre axis Z. The centre axis Z is running in the transversal direction of the tracked vehicle V. The centre axis Z is running in the transversal direction of the track assembly T1. The drive wheel member DW is configured to rotate about the centre axis Z. The drive wheel member DW comprises a hub member H. The hub member H is configured to be operably engaged with the drive axle of the drive means of the tracked vehicle and configured to be rotated by the drive means. The hub member H is thus arranged to rotate about the centre axis Z, see FIG. 3.

The hub member H has according to this embodiment spokes SP. The hub member according to the present disclosure may have any suitable configuration. The drive means may according to an aspect of the present disclosure, not shown, be arranged in connection to the drive wheel member such that the drive means, e.g. an electric machine, at least partly is accommodated within the periphery of the drive wheel member, the drive means axle essentially coaxially coinciding with the centre axis Z of the drive wheel member.

The hub member H has a front side H1 and an opposite rear side H2, see FIG. 3. The front side H1 is configured to face out from the vehicle and the rear side H2 is configured to face towards the vehicle, when the drive wheel member DW is mounted to the vehicle. The front side H1 is thus facing out from the side of the vehicle, i.e. in the transversal direction of the vehicle, when the drive wheel member DW is mounted to the vehicle. The front side H1 is thus a transversal front side H1. The rear side H2 is thus facing towards the vehicle in the transversal direction of the vehicle, when the drive wheel member DW is mounted to the vehicle. The rear side H2 is thus a transversal rear side H2. The front side H1 of the hub member may be denoted outer side H1 or transversal outer side H1 of the hub member H since it faces outwardly from the vehicle in the lateral direction of the vehicle. The rear side H2 of the hub member may be denoted inner side H2 or transversal inner side H2 of the hub member H since it faces inwardly in the lateral direction of the vehicle. The outer side H1 of the hub member H is thus facing out from a vehicle in the transversal direction of the vehicle and the inner side H2 of the hub member H is thus facing towards the vehicle in the transversal direction of the vehicle to which the drive wheel member DW is mounted.

According to an aspect of the present disclosure said drive wheel member DW comprises an outer drive sprocket member S1 arranged on the front side H1 of the hub member H and an inner drive sprocket member S2 arranged on the rear side H2 of the hub member H. In FIGS. 2 and 3, the respective drive sprocket member S1 is provided with only one tooth member 10. The respective drive sprocket member S1 is during operation configured to be provided with a set of tooth members 10 configured to be arranged around the circumference of said drive sprocket members S1, S2.

According to an aspect of the present disclosure the outer drive sprocket member S1 is arranged in connection to the outer side H1 of the hub member H and is facing out from a vehicle in the transversal direction of the vehicle and the inner drive sprocket member S2 is arranged in connection to inner side H2 of the hub member H and is thus facing towards the vehicle in the transversal direction of the vehicle to which the drive wheel member DW is mounted. The outer drive sprocket member S1 is thus a transversal outer drive sprocket member S1 and the inner drive sprocket member S2 is thus a transversal inner drive sprocket member S2.

Said drive sprocket members S1, S2 may, according to an aspect of the present disclosure, be denoted drive wheels or drive wheel units. Said outer drive sprocket member S1 may, according to an aspect of the present disclosure, be denoted outer drive wheel or outer drive wheel unit. Said inner drive sprocket member S2 may, according to an aspect of the present disclosure, be denoted inner drive wheel or inner drive wheel unit.

The respective drive sprocket member S1, S2 comprises a set of tooth members 10 arranged around the circumference of said drive sprocket member S1, S2. According to this embodiment, the outer drive sprocket member S1 comprises a set of tooth members 10 arranged around the circumference of said outer drive sprocket member S1, only one tooth member 10 being shown. According to this embodiment, the inner drive sprocket member S2 comprises a set of tooth members 10 arranged around the circumference of said inner drive sprocket member S2, only one tooth member 10 being shown.

The endless track E of the respective track assembly T1 of the tracked vehicle V has an outer side E1 facing out from a vehicle in the transversal direction of the vehicle and an inner side E2 facing towards the vehicle in the transversal direction of the vehicle to which the track assembly is mounted, see FIG. 2. The outer side E1 facing out from a vehicle in the transversal direction of the vehicle V is thus a transversal outer side E1. The inner side E1 facing towards the vehicle in the transversal direction of the vehicle V is thus a transversal inner side E2. The transversal outer side E1and transversal inner side E2 are facing in a direction corresponding to the direction of said centre axis Z.

The endless track E of the respective track assembly T1 of the tracked vehicle V has an outer side E3 facing away from the drive wheel member DW when the track is engaging with the drive wheel member DW and an inner side E4 facing towards the drive wheel member DW when the track is engaging with the drive wheel member DW, see FIG. 2. The outer side E3 is a ground engaging outer side E3, a portion of said ground engaging outer side E3 being configured to engage with the ground, the portion changing during drive and thus rotation of the track E. The outer side E4 is a drive wheel engaging inner side E4, a portion of said drive wheel engaging inner side E4 being configured to engage with the drive wheel member DW, the portion changing during drive and thus rotation of the track E. The ground engaging outer side E3 and the opposite drive wheel engaging inner side E4 of the endless track E are thus facing in a direction orthogonal to the direction of the transversal outer side E1 and transversal inner side E2 of the endless track E. The endless track E is configured to surround wheels of the vehicle, see e.g. FIG. 1, including said drive wheel member DW so that said inner side E4 is facing said wheels.

Said tooth members are 10 configured to engage with an endless track of the tracked vehicle. The endless track E is schematically illustrated in FIG. 2, without recesses on the inner side for said engagement with said tooth members.

The respective drive sprocket member S1, S2 comprises a ring-shaped support member 20 for tooth members of said drive sprocket member S1, S2. According to this embodiment, the outer drive sprocket member S1 comprises a support member 20 for tooth members 10 of said outer drive sprocket member S1. According to this embodiment, the inner drive sprocket member S2 comprises a support member 20 for tooth members 10 of said inner drive sprocket member S2.

Said tooth members 10 are configured to be removably attached to said support member 20.

The support member 20 of the respective drive sprocket member S1, S2 has, according to an aspect of the present disclosure, a ring shaped configuration. The support member 20 of the respective drive sprocket member S1, S2 has an outer side 20a and an opposite inner side 20b. According to an aspect of the present disclosure, the outer side 20a is a radial outer side 20a facing outwardly in the radial direction of the ring shaped support member 20 and the opposite inner side 20b is a radial inner side facing inwardly in the radial direction of the ring shaped support member 20. According to an aspect of the present disclosure, the ring-shaped support member 20 has an outer diameter with said outer side and an inner diameter with said inner side. The radial outer side 20a of said support member 20 is configured to face said drive wheel engaging inner side E4 of said track E when said drive wheel member DW is engaging with said track E.

The support member 20 of the respective drive sprocket member S1, S2 has a first end side 20c and an opposite second end side 20d. The first end side 20c and opposite second end side 20d are configured to face in the direction of said centre axis Z. The first end side 20c and opposite second end side 20d of the support member 20 are configured to face in the transversal direction of said tracked vehicle when said drive wheel member DW and hence track assembly is attached to the tracked vehicle. The first end side 20c is thus a first transversal end side 20c and the opposite second end side 20d is thus a transversal end side 20d.

The first end side 20c of the ring-shaped support member 20 of the outer drive sprocket S1 is configured to face away from the front side H1 of the hub member H when attached to the hub member H. The first end side 20c of the support member 20 of the inner drive sprocket S2 is configured to face away from the rear side H2 of the hub member H when attached to the hub member H.

The first end side 20c of the support member 20 of the outer drive sprocket S1 is configured to face in the same direction as the outer side E1 of the endless track when the drive wheel member is connected to the endless track. The first end side 20c of the support member 20 of the inner drive sprocket S2 is configured to face in the same direction as the inner side E2 of the endless track when the drive wheel member is connected to the endless track. The first end side 20c of the ring-shaped of the respective drive sprocket S1, S2 is thus configured to face away from the endless track in the direction of the centre axis Z.

The first end side 20c of the ring-shaped support member 20 of the respective drive sprocket S1, S2 are thus configured to face away from each other. The first end side 20c of the ring-shaped support member 20 of the outer drive sprocket S1 is thus configured to face away from the first end side 20c of the ring-shaped support member 20 of the inner drive sprocket S2.

The second side 20d of the support member 20 of the outer drive sprocket S1 is configured to face towards the front side H1 of the hub member H when attached to the hub member H. The second side 20d of the support member 20 of the inner drive sprocket S2 is configured to face towards the rear side H2 of the hub member H when attached to the hub member H.

The second end side 20d of the support member 20 of the outer drive sprocket S1 is configured to face away from the outer side E1 of the endless track when the drive wheel member is connected to the endless track. The second end side 20d of the support member 20 of the inner drive sprocket S2 is configured to face away from the inner side E2 of the endless track when the drive wheel member is connected to the endless track. The second end side 20d of the ring-shaped support member 20 of the respective drive sprocket S1, S2 is thus configured to face towards the endless track in the direction of the centre axis.

The second end side 20d of the ring-shaped support member 20 of the respective drive sprocket S1, S2 are thus configured to face towards each other. The second end side 20d of the ring-shaped support member 20 of the outer drive sprocket S1 is thus configured to face towards the second end side 20d of the ring-shaped support member 20 of the inner drive sprocket S2.

Figure 4:
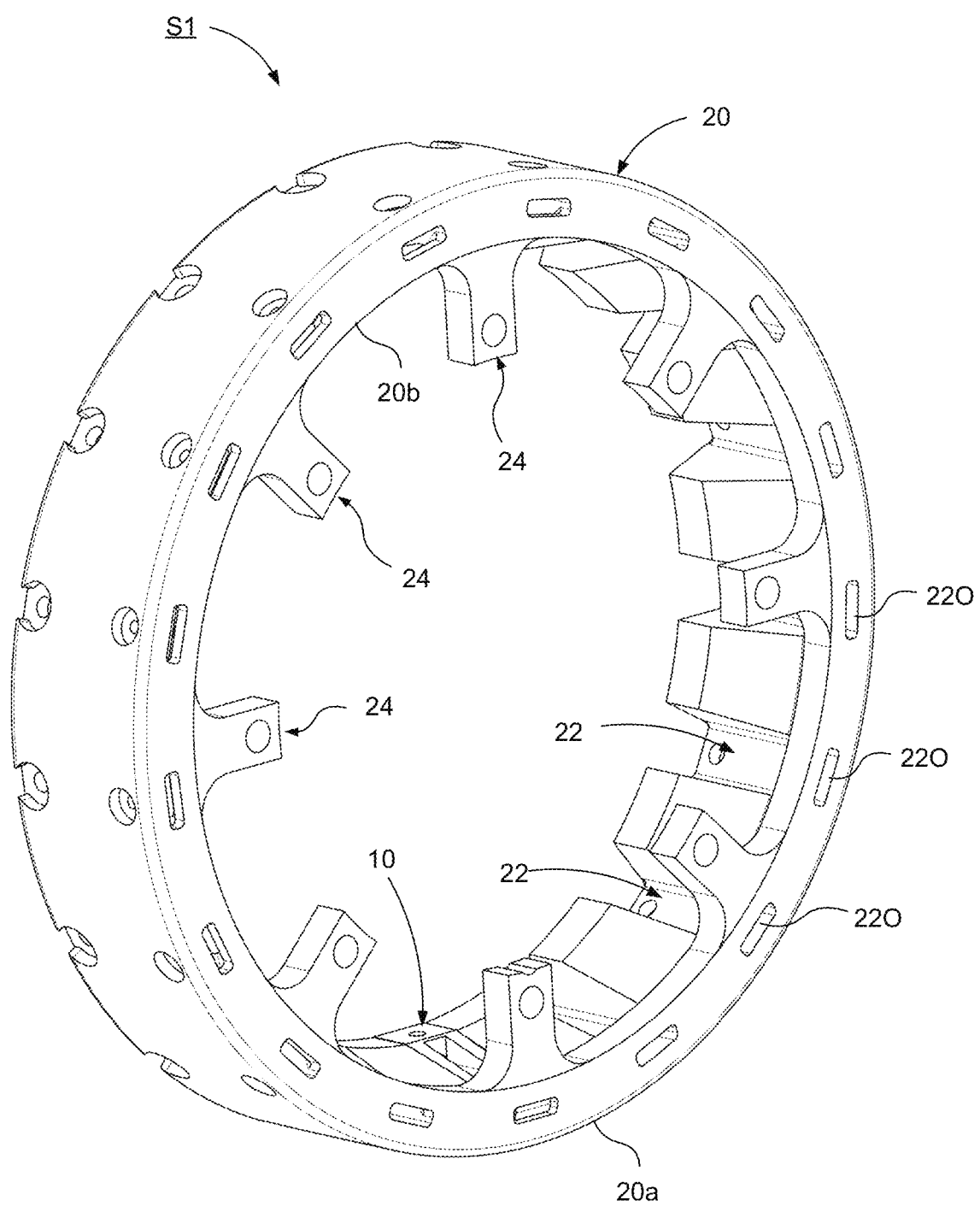
FIG. 4 schematically illustrates a perspective view, viewed from a rear side, of a ring-shaped support member of a drive sprocket member of a drive wheel member for an endless track of a tracked vehicle according to an embodiment of the present disclosure, one tooth member being attached to the support member.
Figure 5A:
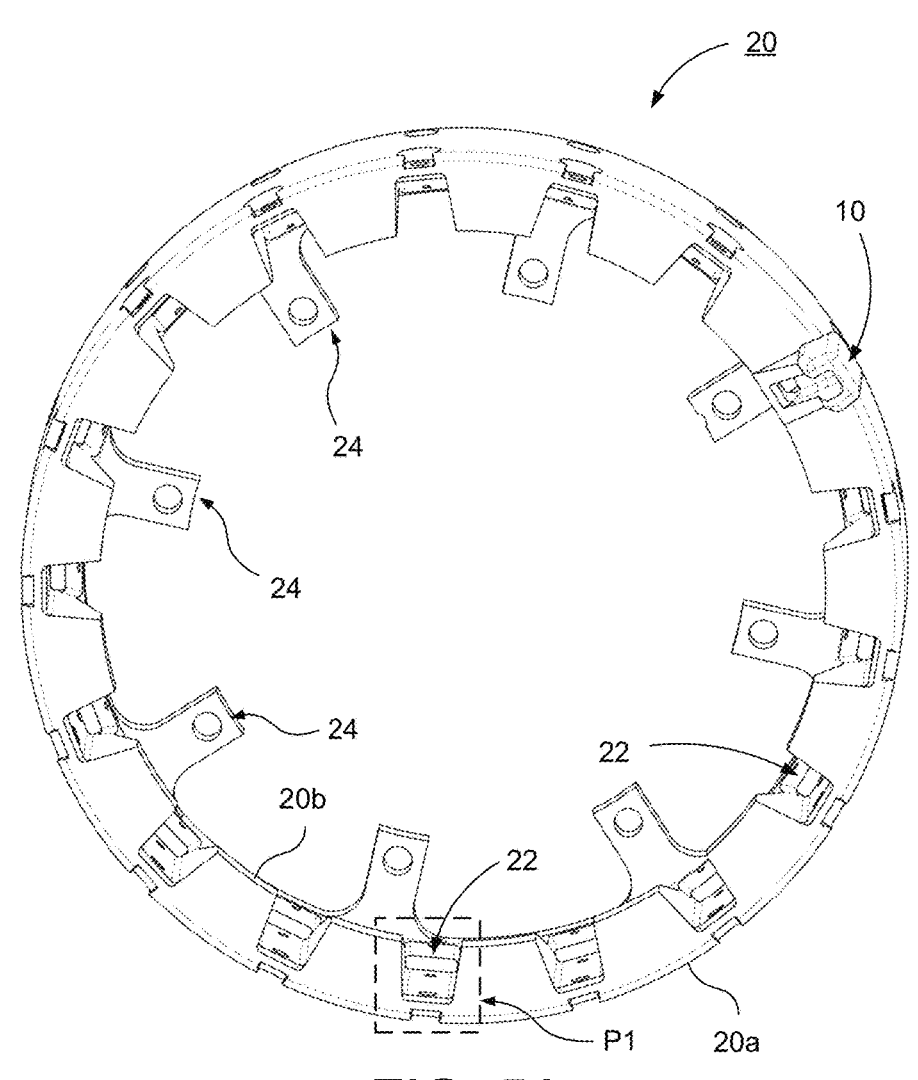
FIG. 5A schematically illustrates a perspective view, viewed from a front side, of the support member in FIG. 4 according to an embodiment of the present disclosure.

FIG. 4 schematically illustrates a perspective view, viewed from a rear side, of a drive sprocket member S1 of a drive wheel member for an endless track of a tracked vehicle according to an aspect of the present disclosure. Said drive sprocket member S1 comprises a ring-shaped support member 20. Only one tooth member 10 is attached to the support member 20. FIG. 5A schematically illustrates a perspective view, viewed from a front side, of the drive sprocket member S1 with the support member 20 in FIG. 4 according to an aspect of the present disclosure. The drive wheel member comprising such a sprocket member S1 may be a drive wheel member according to the drive wheel member DW in FIG. 1. The drive wheel member comprising such a sprocket member S1 may be a drive wheel member according to the drive wheel member DW in FIGS. 2 and 3.

Figure 6:
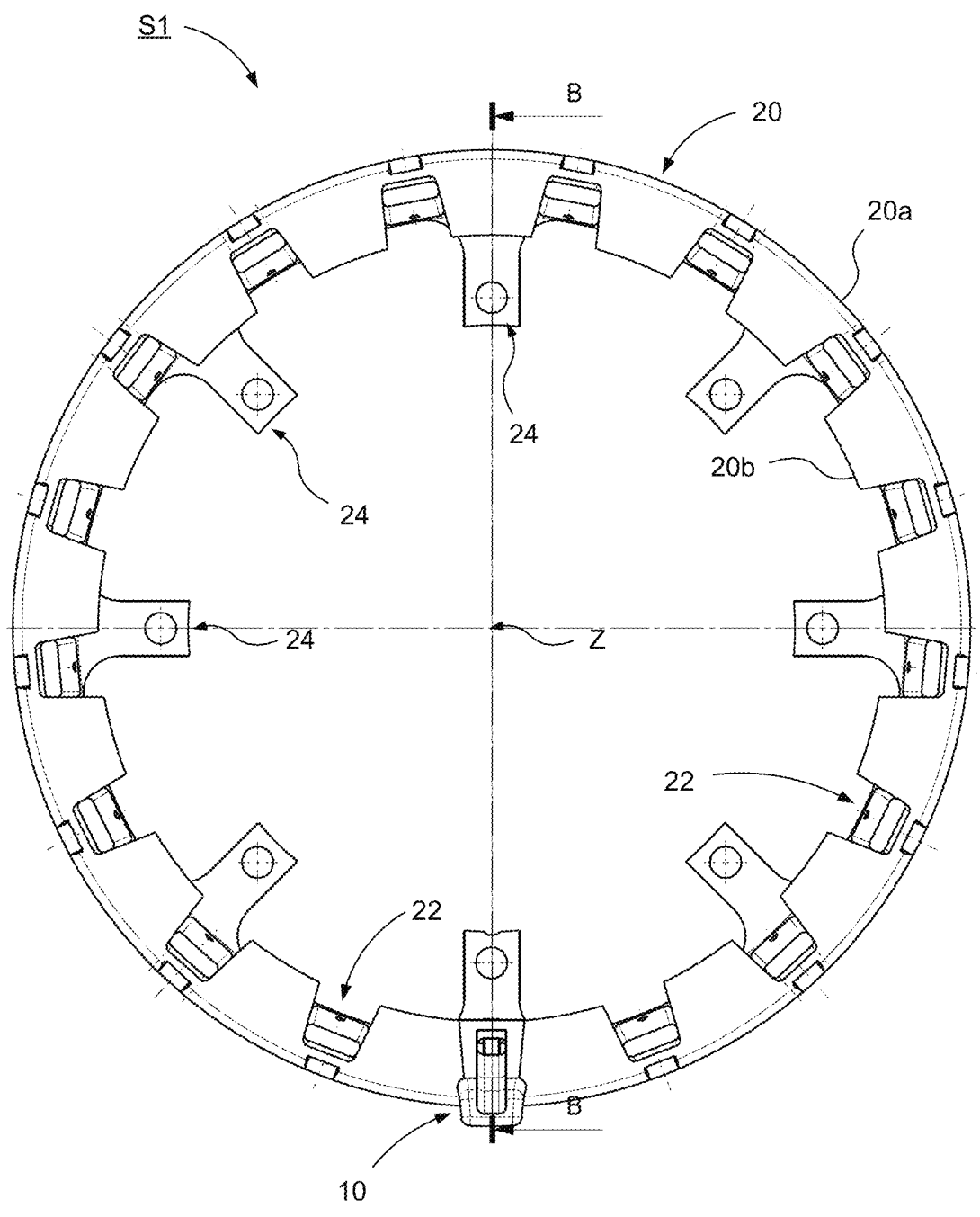
FIG. 6 schematically illustrates a front view of a the support member in FIG. 4 according to an embodiment of the present disclosure.
Figures 8, 9:
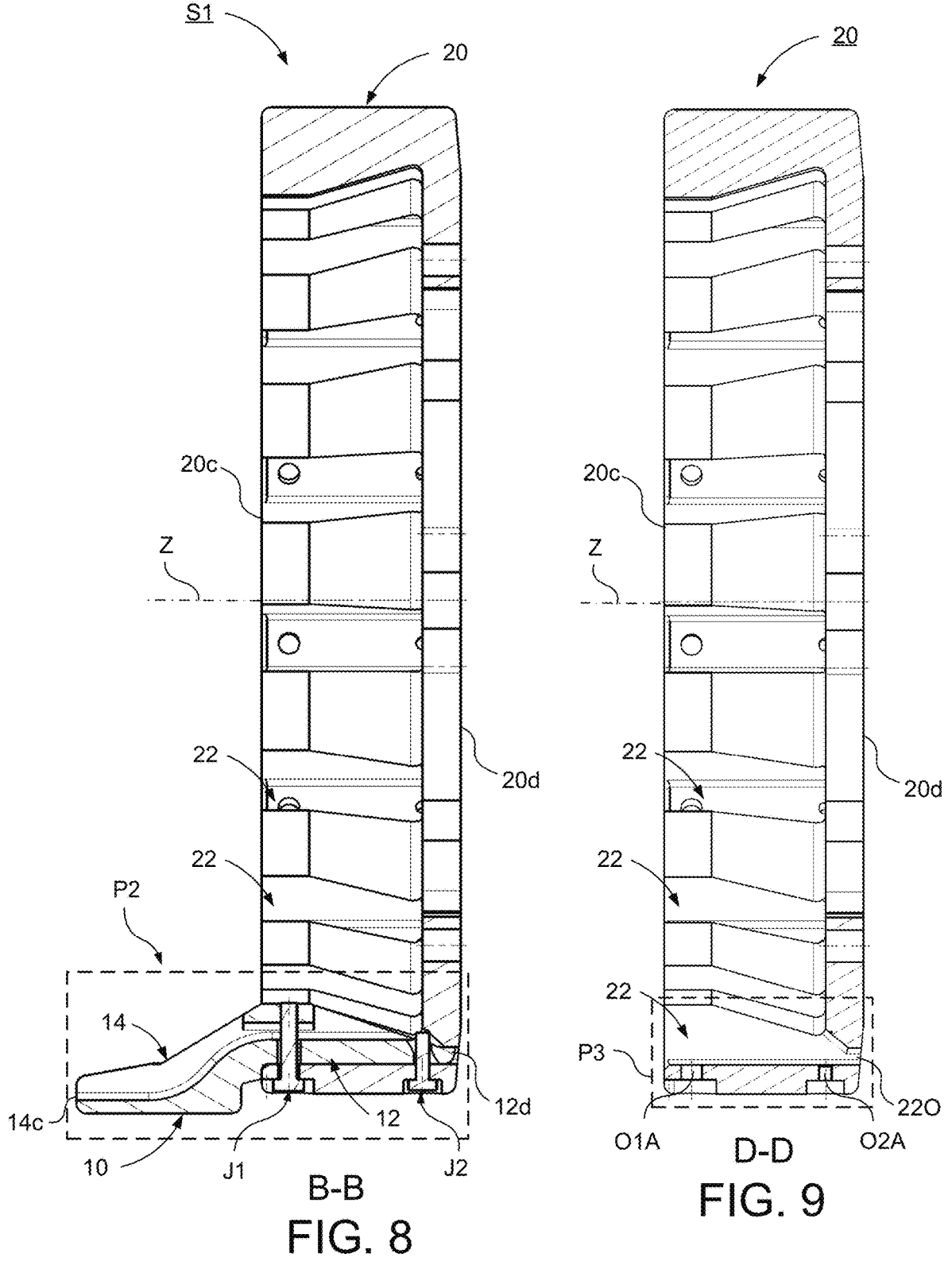
FIG. 8 schematically illustrates a cross sectional view of the support member in FIG. 6 illustrating a cross section of the thus attached tooth member, according to an embodiment of the present disclosure.
FIG. 9 schematically illustrates a cross sectional view of the support member in FIG. 7 illustrating a cross section of a recess into which a tooth member is intended to be received, according to an embodiment of the present disclosure.

FIG. 6 schematically illustrates a front view of a the drive sprocket member S1 with the support member 20 in FIG. 4 according to an aspect of the present disclosure; and FIG. 8 schematically illustrates a cross sectional view of the drive sprocket member S1 with the support member 20 in FIG. 6 illustrating a cross section of the thus attached tooth member 10, according to an aspect of the present disclosure.

Figure 7:
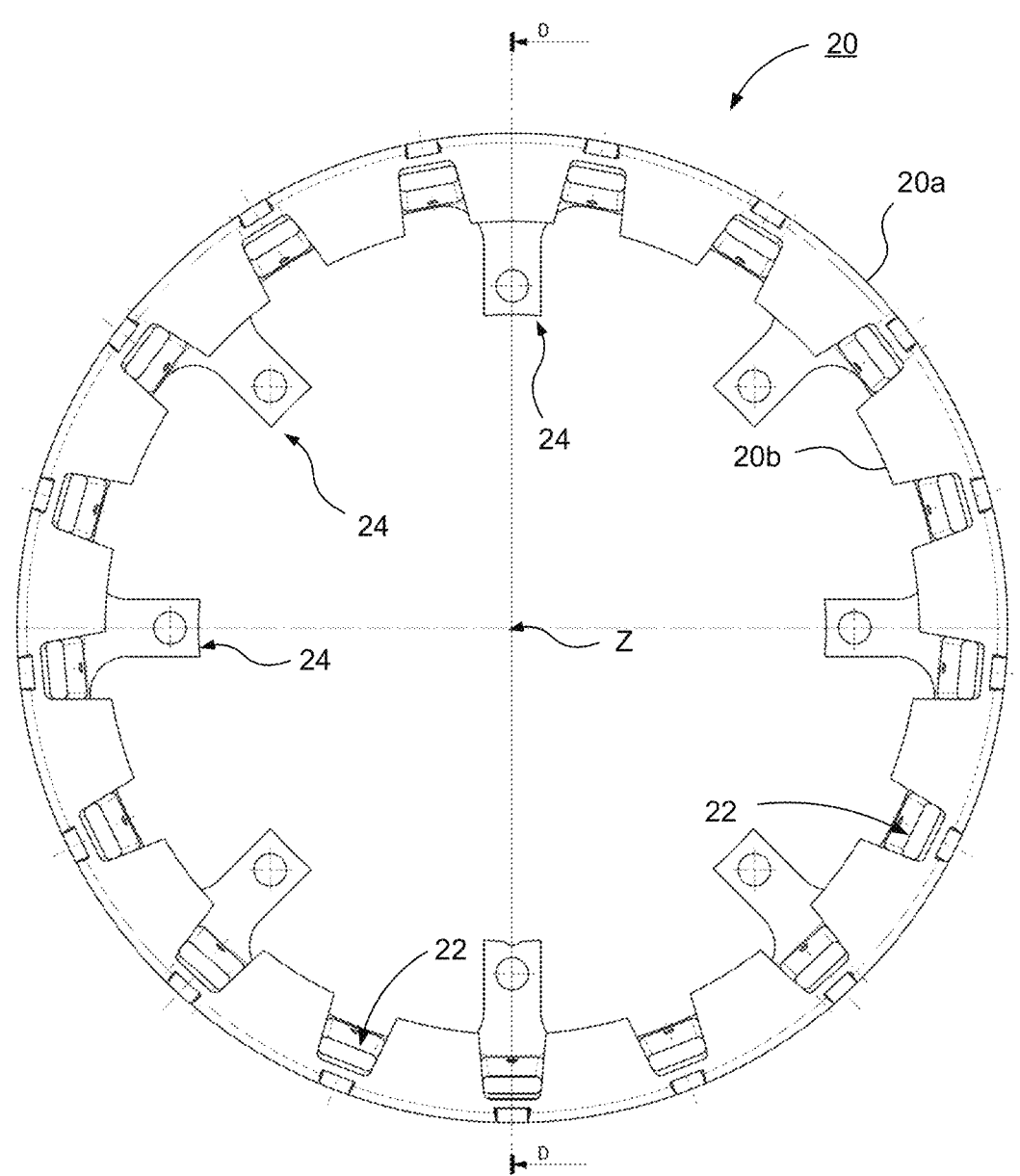
FIG. 7 schematically illustrates a front view of a the support member in FIG. 4, without any tooth member attached thereto, according to an embodiment of the present disclosure.

FIG. 7 schematically illustrates a front view of a the support member 20 in FIG. 4, without any tooth member attached thereto, according to an aspect of the present disclosure; and FIG. 9 schematically illustrates a cross sectional view of the support member 20 in FIG. 7 illustrating a cross section of a recess 22 into which a tooth member is intended to be received, according to an aspect of the present disclosure. Thus, according to an aspect of the present disclosure, the support member 20 comprises a set of recesses 22 distributed around the circumference of said support member 20. According to an aspect of the present disclosure, the respective recess 22 is configured to receive a tooth member 10 of a set of tooth members. According to an aspect of the present disclosure, the respective recess 22 is arranged on said inner side 20*b* of said ring-shaped support member 20. According to an aspect of the present disclosure, the respective recess 22 is arranged on said radial inner side 20*b* of said ring-shaped support member 20 and are configured to face in the radial direction towards the centre axis Z. According to an aspect of the present disclosure, the respective recess 22 is configured to run between said first end side 20*c* and said opposite second end side 20*d* of said ring-shaped support member 20. According to an aspect of the present disclosure, the respective recess 22 is configured to run between said first end side 20*c* and said opposite second end side 20*d* of said ring-shaped support member 20 in an axial direction, i.e. a direction essentially parallel to the axial direction of the centre axis. According to an aspect of the present disclosure, the respective recess 22 is configured to run between said first end side 20*c* and said opposite second end side 20*d* of said ring-shaped support member 20 in the transversal direction of the tracked vehicle when said drive wheel member is attached to the vehicle. An embodiment of said recess 22 is described in more detail below, with reference to FIGS. 5B and 5C and also FIGS. 10A and 10B.

Said tooth members 10, when arranged on and distributed around the support member 20 of the respective drive sprocket member S1, S2, are according to an aspect of the present disclosure configured to protrude from said outer side 20*a* so as to engage with said endless track.

Said tooth members 10, when arranged on and distributed around the support member 20 of the respective drive sprocket member S1, S2, are configured to project from said first end side 20*c*. According to an aspect of the present disclosure, an engagement portion of the respective tooth member 10 is configured to project from the first end side 20*c* in a direction essentially parallel to the direction of the centre axis Z so as to engage with said endless track when the tooth member is in an operation position.

According to an aspect of the present disclosure, the respective drive sprocket member S1, S2 comprises a set of fastening members 24 arranged around the inner side 20*b* of the respective ring shaped support member 20, see FIGS. 4, 5A, 6 and 7, showing the set of fastening members 24 for the outer drive sprocket member S1. The respective fastening member 24 comprises or is arranged to receive a bolt joint member, not shown, for attaching the respective drive sprocket member S1, S2 to the hub member H of the drive wheel member DW. According to an aspect of the present disclosure, the fastening members 24 are configured to be attached to spokes of the hub member H.

The drive wheel member according to the present disclosure may according to an alternative aspect of the present disclosure, not shown, be provided with a single drive sprocket member. The drive wheel member according to the present disclosure may according to an aspect of the present disclosure be provided with a single drive sprocket member, not shown, having tooth members arranged around the circumference of said single drive sprocket and one support member for said tooth members. The tooth members are configured to be removably attached to the single support member of the drive sprocket member, not shown.

The present disclosure comprises a fastening arrangement of a drive wheel member DW for facilitating fastening a tooth member 10 of the set of tooth members 10 to the support member 20 of the drive wheel member. The present disclosure comprises a fastening arrangement for facilitating fastening a tooth member 10 of the set of tooth members 10 to the respective support member 20 of the drive wheel member DW. The present disclosure comprises a fastening arrangement for facilitating fastening tooth members 10 of the set of tooth members 10 to the respective support member 20. The present disclosure may comprise a set of fastening arrangements for facilitating fastening the respective tooth member 10 of the set of tooth members 10 to the respective support member 20. The present disclosure comprises a fastening arrangement of a drive wheel member DW for facilitating detachably fastening a tooth member 10 of the set of tooth members 10 to the support member 20 of the drive wheel member. The present disclosure comprises a fastening arrangement of a drive wheel member DW for facilitating detachably fastening and detainably arranging a tooth member 10 of the set of tooth members 10 to the support member 20 of the drive wheel member.

The drive wheel member DW comprises a fastening arrangement for facilitating fastening a tooth member 10 of the set of tooth members 10 to the support member 20. The drive wheel member DW comprises a fastening arrangement for facilitating fastening a tooth member 10 of the set of tooth members 10 to the respective support member 20. The drive wheel member may comprise a fastening arrangement for facilitating fastening tooth members 10 of the set of tooth members 10 to the respective support member 20. The drive wheel member DW may comprise a set of fastening arrangements for facilitating fastening the respective tooth member 10 of the set of tooth members 10 to the respective support member 20.

Figure 10A:
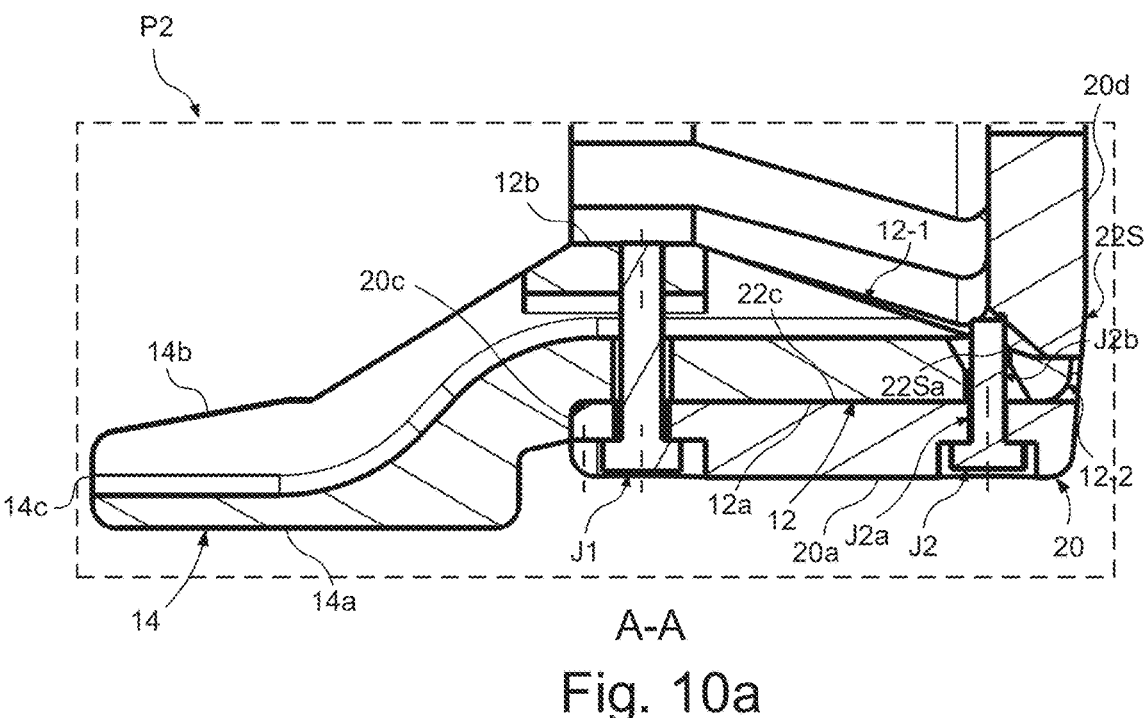
FIG. 10A schematically illustrates a portion of the support member in FIG. 8 with the cross section of the thus attached tooth member according to an embodiment of the present disclosure.
Figure 10B:
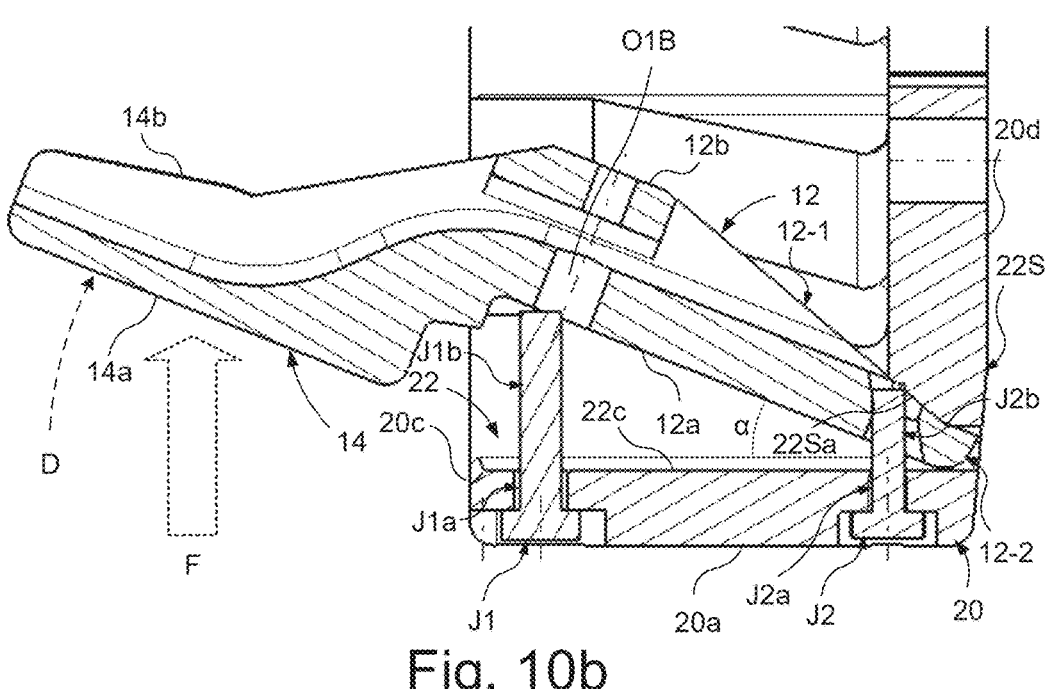
FIG. 10B schematically illustrates the cross section of the tooth member in FIG. 10A in a detached and detained state, according to an embodiment of the present disclosure.

FIG. 10A schematically illustrates a portion P2 of the support member 20 in FIG. 8 with the cross section of the thus attached tooth member 10 according to an aspect of the present disclosure; and FIG. 10B schematically illustrates the cross section of the tooth member in FIG. 10A in a detached and detained state, according to an aspect of the present disclosure. FIGS. 10A and 10B illustrate a fastening arrangement of a drive wheel for facilitating detachably fastening and detainably arranging a tooth member 10 of a set of tooth members 10 to a support member 20 of the drive wheel member, according to an aspect of the present disclosure.

FIGS. 10A and 10B thus illustrate a portion of a drive wheel member for an endless track of a tracked vehicle of the present disclosure, e.g. a drive wheel member DW for a tracked vehicle V according to FIG. 2. Such a drive wheel member DW is configured to be rotatable about a centre axis Z for rotating said endless track. Such a drive wheel member DW comprises a hub member H and a drive sprocket member S1, S2.

According to an aspect of the present disclosure, said drive wheel member DW comprises an outer drive sprocket member S1 arranged on the outer side H1 of the hub member H and an inner drive sprocket member S2 arranged on the inner side H2 of the hub member H, the outer side H1 facing out from a vehicle in the transversal direction of the vehicle and the inner side H2 facing towards the vehicle in the transversal direction of the vehicle to which the drive wheel member DW is mounted, see FIG. 2.

Said drive sprocket member comprises a set of tooth members 10 arranged around the circumference of said drive sprocket member S1, S2, said tooth members 10 being configured to engage with said endless track E. Said drive sprocket member S1, S2 further comprises a ring-shaped support member 20 for tooth members 10 of said drive sprocket member. In FIG. 10A a cross section of one tooth member 10, attached to the support member 20, is shown. The tooth members 10 are configured to be removably attachable to said support member 20.

The fastening arrangement is configured for fastening a tooth member 10 of the set of tooth members 10 to the support member 20 so that said tooth member 10 is in an operation position for engaging with said endless track, see FIG. 10A.

The operation position of the tooth member 10 according to an aspect of the present disclosure is illustrated in FIG. 10A, where the tooth member 10 is attached to the support member so that a connection portion is attached on the inner side 20b of the support member.

According to an aspect of the present disclosure, in the operation position of the tooth member 10 as illustrated in FIG. 10A, said connection portion 12 of the tooth member 10 is fixedly connected to a recess bottom 22c of a recess 22 on the inner side 20b. According to an aspect of the present disclosure, in the operation position of the tooth member 10 is illustrated in FIG. 10A, an engagement portion 14 of the tooth member is configured to project from a first end side 20c of the support member 20 in a direction essentially parallel to the centre axis Z of the support member 20 and hence drive wheel member, see e.g. FIG. 8.

Said fastening arrangement comprises an attachment device configured to detachably attach said tooth member 10 to said support member 20 such that said tooth member 10 is detached from the operation position if said tooth member 10 is subjected to a radial force F exceeding a certain threshold, see FIG. 10B. Said radial force F may be due to material, e.g. stones or the like, appearing between the drive wheel member, e.g. portion of the tooth member 10 being configured to engage with the endless track, and the endless track. Said radial force F may be a predetermined force.

An embodiment of the configuration of the tooth member 10 is described in more detail below, in particular with reference to FIGS. 11A-11C and 12A-12C. An embodiment of the configuration of the recess 22 is described in more detail below, in particular with reference to FIGS. 5B and 5C.

Said attachment device comprises a fastener J1, e.g. a screw joint member, configured to connect said tooth member 10 to said support member 20 in said operation position. Said fastener J1 is configured to provide a resistance force such that said tooth member 10 remains attached in said operation position during normal operation where if said tooth member 10 is subjected to a radial force not exceeding said certain threshold. Said fastener J1 is configured to provide an attachment of said tooth member 10 to said support member 20 so as to hold said tooth member 10 in said operation position said tooth member 10 is subjected to a radial force not exceeding said certain threshold. Said fastener J1 is further configured to provide a resistance force such that said tooth member 10 is detached from the operation position if subjected to said radial force exceeding said certain threshold.

According to an aspect of the present disclosure, the joint member J1 is configured to be introduced from the outer side 20a of the support member 20 for connecting said tooth member 10 to the support member 20.

Thus, said ring-shaped support member 20 has an outer side 20a configured to face the endless track of the tracked vehicle when the drive wheel member is mounted to the tracked vehicle and an opposite inner side 20b, wherein said tooth member 10 comprises a connection portion 12 configured to be arranged in connection to said inner side 20b of said support member 20 and an engagement portion 14 configured to project from the ring-shaped support member so as to engage with said endless track in said operation position.

According to an aspect of the present disclosure, said connection portion 12 is configured to be arranged in connection to said radial inner side 20b of said support member 20 so that it face in the radial direction towards the centre axis Z.

According to an aspect of the present disclosure, said engagement portion 14 is configured to project from the ring-shaped support member 20 in a direction essentially parallel to the axial direction of said centre axis Z outwardly from said transversal outer side 20c of said support member 20. According to an aspect of the present disclosure, said engagement portion 14 configured to project from the ring-shaped support member 20 outwardly from said outer side 20c of said support member 20 in a transversal direction relative to the vehicle when said drive wheel member is attached to the vehicle.

According to an aspect of the present disclosure, said engagement portion 14 is configured to project relative to the ring-shaped support member 20 in a radial direction away from said axial direction of said centre axis Z so that a radial outer side 14a of said engagement portion 14 is at a radial distance from said centre axis Z which is greater than the radial distance of the radial outer side 20a of said support member 20 so as to facilitate said engagement with said endless track in said operation position.

Said ring-shaped support member 20 has, as mentioned, a first end side 20c and an opposite second end side 20d, said end sides facing in a direction parallel to the direction of said centre axis Z. Said engagement portion 14 is configured to project from the first end side 20c in a direction essentially parallel to the direction of the centre axis Z so as to engage with said endless track when said tooth member 10 is arranged in said operation position with said connection portion being attached in connection to the inner side 20b of the support member 20.

According to an aspect of the present disclosure, said fastening arrangement comprises said recess 22 arranged on said inner side 20b of said ring-shaped support member 20. As described in and explained in more detail with reference to FIGS. 5B and 5C, said recess 22 is configured to run between said first end side 20c and said opposite second end side 20d. Said connection portion 12 of said tooth member 10 is configured to be closely received in connection to said recess 22 in said operation position. Said recess 22 is thus configured to receive said connection portion 12. According to an aspect of the present disclosure a surface portion of an outer side 12a of said connection portion 12 is configured to face and lie against a recess bottom, when said tooth member is in the operation position. According to an aspect of the present disclosure a surface portion of said outer side 12a of said connection portion 12 is configured to face in the radial direction away from said centre axis Z, when said tooth member 10 is in the operation position.

According to an aspect of the present disclosure, said fastener J1 of said attachment device is configured to attach said connection portion 12 of said tooth member 10 to the recess 22 of said support member 20 in connection to said first end side 20c. According to an aspect of the present disclosure, said recess 22 is configured to be open in the radial direction towards said centre axis Z in connection to the first end side 20c and at least a certain portion along the way from the first end side 20c towards the second end side 20d such that said tooth member 10 is allowed to detach from the operation position if subjected to said radial force F exceeding said certain threshold, see FIG. 10B and FIG. 5B.

According to an aspect of the present disclosure, said fastener J1 comprises an attachment portion J1a configured to facilitate fixed attachment of said fastener J1 to said support member 20. See FIGS. 10A and 10B.

According to an aspect of of the present disclosure, said fastener J1 of said attachment device has a projection portion J1b configured to project from the bottom 22c of said recess 22 in the radial direction in connection to said first end side 20c. Said attachment device further comprises an opening O1B arranged in said connection portion 12 of said tooth member 10, said projection portion Jib being configured to be received in said opening O1B when said tooth member 10 is in the operation position. Said opening O1B is dimensioned and configured to be engaged with said projection portion Jib such that if said tooth member 10 is subjected to said radial force F exceeding said certain threshold, said tooth member 10 is allowed to detach from said projection portion.

According to an aspect of the present disclosure, said fastening arrangement is arranged such that said tooth member 10 is configured to be detainably arranged in connection to said support member 20 such that, if said tooth member 10 is subjected to said radial force F exceeding a certain threshold resulting in said detachment from the operation position, said tooth member 10 is detained in connection to said support member 20, see FIG. 10B. Thus, said tooth member 10 is configured to be detainably arranged in connection to said support member 20 such that, if said tooth member 10 is subjected to said radial force F exceeding a certain threshold resulting in said detachment from the operation position, said tooth member 10 remains in connection to said support member 20, see e.g. FIG. 10B.

According to an aspect of the present disclosure, said fastening arrangement further comprises a detaining device J2, 22O, 22S configured to detain said tooth member 10 if said tooth member 10 is subjected to said radial force F exceeding a certain threshold resulting in said detachment from the operation position.

According to an aspect of the present disclosure, said detaining device J2, 22O, 22S is configured to movably connect said tooth member 10 to said support member 20 such that if said tooth member 10 is subjected to said radial force F exceeding a certain threshold, said tooth member 10 is tiltably moved in the radial direction. As illustrated in FIG. 10B, said radial force F is provided towards the outer side 14a in the radial direction towards the centre axis of said ring shaped support member 20. According to an aspect of the present disclosure, said tooth member 10 is tiltably moved in the radial direction in a pivotable movement D so that the engagement portion 14 is moving towards the first end side 20c of the support member 20.

According to an aspect of the present disclosure, said detaining device is configured to detain said connection portion 12 of said tooth member 10 in connection to said second end side 20d, such that if said tooth member 10 is subjected to said radial force F exceeding said certain threshold, said tooth member 10 is tiltably moved in the radial direction from said operation position so that the tooth member 10 is positioned with a certain angle α relative to the direction of the centre axis Z. According to an aspect of the present disclosure, said tooth member 10, when subjected to said radial force F exceeding a certain threshold, is tiltably moved in the radial direction from said operation position towards an to a detachment position so that the tooth member 10 is positioned with a certain angle α relative to the direction of the centre axis Z.

According to an aspect of the present disclosure, said tooth member 10, when subjected to said radial force F exceeding a certain threshold, is tiltably moved in the radial direction from said operation position to a position in which said connection portion 12 is at least partly received within said recess 22 so that the tooth member 10 is essentially prevented to move in the direction orthogonal to the radial direction and orthogonal to the direction of the centre axis Z. According to an aspect of the present disclosure, said recess comprises opposite inner walls 22a, 22b and a recess bottom 22c, wherein said connection portion 12 is at least partly received within said recess 22 so that said inner walls prevents movement of said connection portion 12 when the tooth member 10 is tiltably moved in the radial direction. According to an aspect of the present disclosure, said recess bottom 22c is configured to face in the radial direction towards said centre axis Z.

According to an aspect of the present disclosure, said detaining device comprises said recess 22. According to an aspect of the present disclosure, said detaining device is configured to detain said connection portion 12 of said tooth member 10 in connection to said second end side 20d, such that if said tooth member 10 is subjected to said radial force F exceeding said certain threshold, said tooth member 10 is tiltably moved in the radial direction from said operation position to a position in which said connection portion 12 is at least partly received within said recess 22 so that the tooth member 10 is essentially prevented to move in the direction orthogonal to the radial direction and orthogonal to the direction of the centre axis Z.

According to an aspect of the present disclosure, said detaining device comprises a detaining member 22O, 22S comprising a second end side opening 22O in connection to said second end side 20d and a stop portion 22S provided by said opening 22O. According to an aspect of the present disclosure, said second end side opening 22O is arranged in connection to and providing an extension of said recess 22. According to an aspect of the present disclosure, said second end side opening 22O is arranged to receive a detaining portion 12-2 of said connection portion 12. Said detaining portion 12-2 is thus configured to be received in said end side opening 22O. Said stop portion 22S is configured to prevent movement of said received detaining portion 12-2 in the radial direction towards the centre axis Z. See e.g. FIG. 10B.

According to an aspect of the present disclosure, said detaining device comprises a connection member J2 having a projection portion configured to project from the recess bottom 22c of said recess 22 in the radial direction in connection to said second end side 20d. According to an aspect of the present disclosure, said connection member J2 comprises an attachment portion J2a configured to facilitate fixed attachment of said connection member J2 to said support member 20. See FIGS. 10A and 10B.

According to an aspect of the present disclosure, said detaining device further comprises an opening O2B arranged in said connection portion 12 of said tooth member 10, see FIG. 12C. According to an aspect of the present disclosure, said projection portion J2b is configured to be received in said opening O2B when said tooth member 10 is in the operation position. According to an aspect of the present disclosure, said projection portion J2b is configured to be at least partly received in said opening O2B when said tooth member 10 is detainably detached from the operation position.

According to an aspect of the present disclosure, said opening O2B is dimensioned and configured to be engaged with said projection portion J2b such that if said tooth member 10 is subjected to said radial force F exceeding said certain threshold, said tooth member 10 is allowed to pivotably move in the radial direction towards the centre axis Z in connection to said opening O2B from a position essentially parallel to the centre axis Z to a position with a certain angle $\alpha$ relative to the direction of the centre axis Z. See FIG. 10B.

According to an aspect of the present disclosure, said projection portion J2b is configured to essentially prevent movement of said tooth member in the direction of the centre axis Z.

According to an aspect of the present disclosure, said stop portion 22S has an angled surface portion 22Sa configured to face towards said connection portion 12 such that if said tooth member 10 is subjected to said radial force F exceeding a certain threshold, said tooth member 10 is allowed to tiltably move in the radial direction to an angled position where said connection portion 12 is stopped towards said angled surface portion 22Sa of said stop portion 22S.

Figures 5B, 5C:
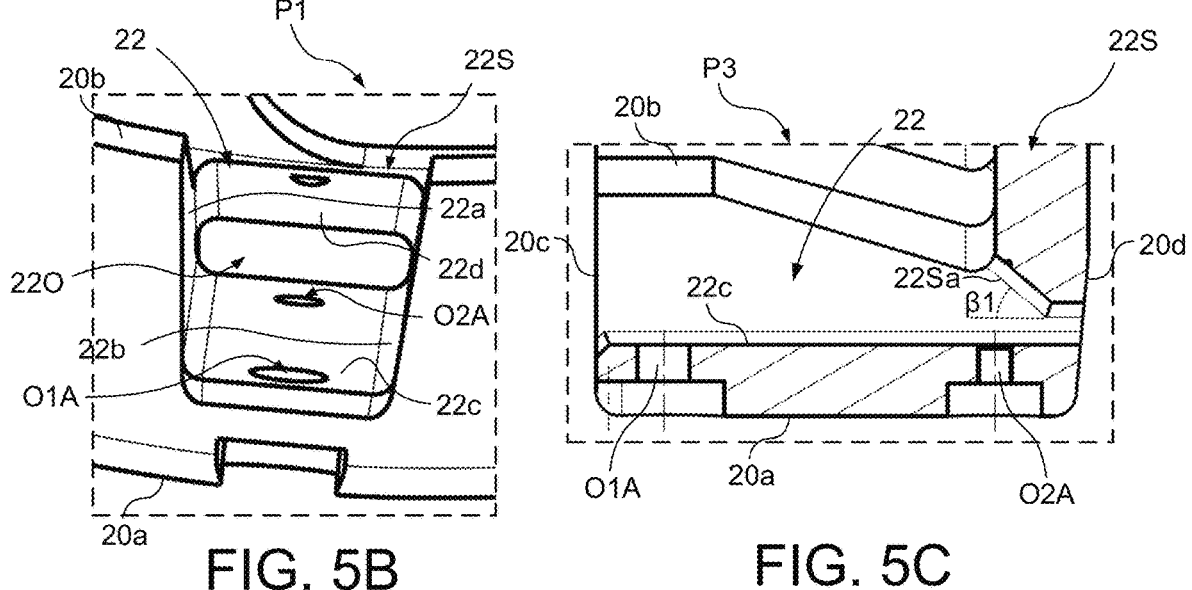
FIG. 5B schematically illustrates a perspective view of a portion of the support member in FIG. 5A illustrating a recess according to an embodiment of the present disclosure.
FIG. 5C schematically illustrates a perspective view of a portion of the support member in FIG. 9 illustrating a cross section of the recess according to an embodiment of the present disclosure.

FIG. 5B schematically illustrates a perspective view of a portion of the support member 20 in FIG. 5A illustrating a recess 22 according to an embodiment of the present disclosure; and, FIG. 5C schematically illustrates a perspective view of a portion P3 of the support member 20 in FIG. 9 illustrating a cross section of the recess 22 according to an embodiment of the present disclosure.

As mentioned above the ring-shaped support member 20 comprises a set of recesses 22 distributed around said support member 22. Each recess is configured to receive a connection portion 12 of a tooth member 10 of said set of tooth members 10. According to an aspect of the present disclosure, a connection portion 12 of a tooth member 10 is configured to be closely received within said recess 22. According to an aspect of the present disclosure, said recess 22 is configured to receive said connection portion 12 of a tooth member 10. According to an aspect of the present disclosure, said connection portion 12 of each tooth member 10 is configured to lockingly fit in said the respective recess 22.

According to an aspect of the present disclosure, said fastening arrangement comprises such a recess 22.

According to an aspect of the present disclosure, said recess 22 is arranged on the inner side 20b of said ring-shaped support member 20. According to an aspect of the present disclosure, said recess 22 is configured to run between said first end side 20c and said opposite second end side 20d of said support member 20, see e.g. FIG. 5C.

Said connection portion 12 of said tooth member 10 is configured to be closely received in connection to said recess 22 in an operation position of the tooth member 10, see e.g. FIG. 10A.

According to an aspect of the present disclosure, said recess 22 has an essentially U-shaped profile when viewed from the first end side 20c of said ring-shaped support member 20, see e.g. FIG. 5B. According to an aspect of the present disclosure, said recess 22 has an essentially U-shaped configuration running from the first end side 20c towards the second end side 20d of said ring-shaped support member 20, see e.g. FIG. 5B.

According to an aspect of the present disclosure, said recess 22 has opposite inner walls 22a, 22b. Said opposite inner walls 22a, 22b are arranged at a distance from each other so as to receive a connection portion 12 of a tooth member 10. Said opposite inner walls 22a, 22b constitutes a first inner wall 22a and an opposite second inner wall 22b. According to an aspect of the present disclosure, said inner walls 22a, 22b are configured to run from the inner side 20b a certain distance towards the outer side 20a of the support member 20. The inner walls 22a, 22b are configured to run from the first end side 20c towards the second end side 20d.

According to an aspect of the present disclosure, said inner walls 22a, 22b are configured to run from the inner side 20b towards a recess bottom 22c. The recess bottom 22c is thus configured to run from the first end side 20c towards the second end side 20d. The recess 22 thus has inner walls 22a, 22b and a recess bottom 22c.

According to an aspect of the present disclosure, said recess 22 has an inner end 22d in connection to said second end side 20d of said support member 20. According to an aspect of the present disclosure, said inner side 22d is providing a connection of said inner walls 22a, 22b, running essentially perpendicular to said inner walls 22a, 22b.

According to an aspect of the present disclosure, as illustrated in e.g. FIG. 5B, the respective inner wall 22a, 22b of said recess 22 has an inclination relative to the direction perpendicular to the radial direction of the support member 20. According to an aspect of the present disclosure, the respective inner wall 22a, 22b of said recess 22 has an inclination such that the distance between the inner walls 22a, 22b in connection to the inner side 20b of the support member 20 is greater than the distance between the inner walls 22a, 22b in connection to the recess bottom 22c.

According to an aspect of the present disclosure, as illustrated in e.g. FIGS. 5A and 5B, said recess is open in the radial direction towards the centre axis Z of the support member 20, in connection to the first end side 20c and a certain portion along the way from the first end side 20c towards the second end side 20d. Hereby the tooth member 10, i.e. the connection portion 12 of the tooth member 10, is allowed to detach from the operation position in which it is closely received within said recess 22, if subjected to a radial force exceeding a certain threshold.

According to an aspect of the present disclosure, said recess 22 comprises, or is arranged in connection to, a second end side opening 22O in connection to said second end side 20d. According to an aspect of the present disclosure, said second end side opening 22O constitutes an opening 22O in connection to said inner end 22d of said recess 22, wherein said end side opening 22O is arranged in connection to the recess bottom 22c, providing an extension of the recess 22 through the second end side 20d.

According to an aspect of the present disclosure, said end side opening 22O is configured to provide a stop portion 22S, said stop portion 22S having said inner side 22d facing towards the first end side 20c.

According to an aspect of the present disclosure, said second end side opening 22O is configured to receive a detaining portion 12-2 of a connection portion 12 of a tooth member 10, wherein said stop portion 22S is configured to prevent movement of said received detaining portion 12-2 in the radial direction towards the centre axis, see e.g. FIGS. 10A and 10B.

According to an aspect of the present disclosure, said support member 20, i.e. said recess 22 of said support member 20, has a first opening O1A configured to run from the outer side 20a towards and through the recess bottom 22c. According to an aspect of the present disclosure, said first opening O1A is configured to run from the outer side 20a through the recess bottom 22c in the radial direction of the support member 20. According to an aspect of the present disclosure, said first opening O1A is configured to be coaxially arranged relative to an opening O1B running from the outer side 12a towards the inner side 12b of the connection portion 12, when said tooth member 10 is arranged in the operation position in said recess 22. According to an aspect of the present disclosure, said first opening O1A is configured to receive a fastener J1, said fastener according to an aspect being a joint member J1, e.g. a screw joint member, for attaching the tooth member 10 to the support member 20. According to an aspect of the present disclosure, said first opening O1A is arranged relatively close to the first end side 20c of said support member 20. Said joint member is configured to run through said openings O1A, O1B and being configured to attach the tooth member 10, providing a certain resistance requiring a radial force exceeding a certain threshold to overcome. Said first opening O1A is a fastening opening O1A of the support member 20.

According to an aspect of the present disclosure, said support member 20, i.e. said recess 22 of said support member 20, has a second opening O2A configured to run from the outer side 20a towards and through the recess bottom 22c. According to an aspect of the present disclosure, said second opening O2A is configured to run from the outer side 20a through the recess bottom 22c in the radial direction of the support member 20. According to an aspect of the present disclosure, said second opening O2A is configured to be coaxially arranged relative to an opening O2B running from the outer side 12a of the towards and through the inner side 12b of the connection portion 12, when said tooth member 10 is arranged in the operation position in said recess 22. According to an aspect of the present disclosure, said second opening O2A is arranged relatively close to the second end side 20d of said support member 20, when said tooth member 10 is arranged in the operation position in said recess 22. Said second opening O2A is a fastening opening O2A of the support member 20.

According to an aspect of the present disclosure, said second opening O2A is configured to receive a connection member J2. According to an aspect of the present disclosure, said connection member J2 comprises an attachment portion J2a configured to facilitate fixed attachment of said connection member J2 to said fastening opening O2A of said support member 20. According to an aspect of the present disclosure, said connection member J2 comprises a projection portion J2b configured to project from the bottom portion 22c of said recess 22 in the radial direction in connection to said second end side 20d, when said tooth member 10 is arranged in connection to said recess 22.

Figure 11A:
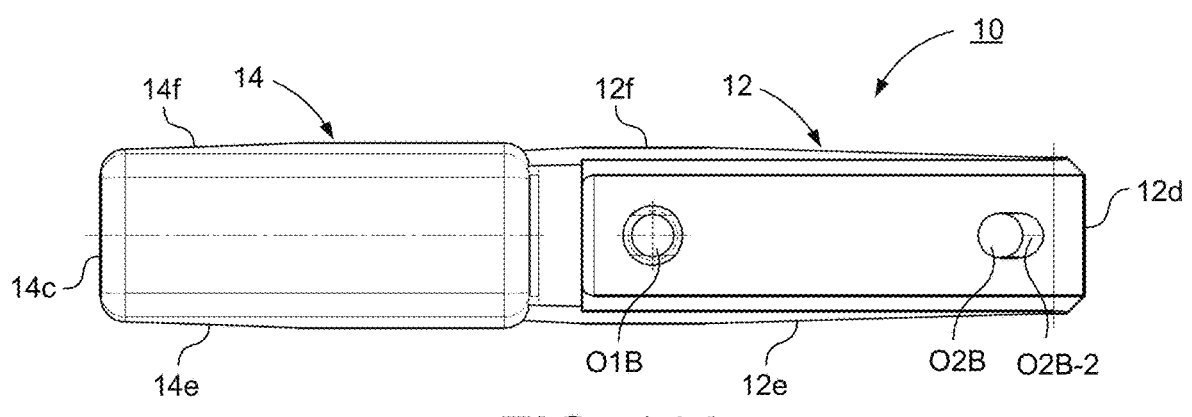
FIG. 11A schematically illustrates an outer plan view of a tooth member according to an embodiment of the present disclosure.
Figure 11B:
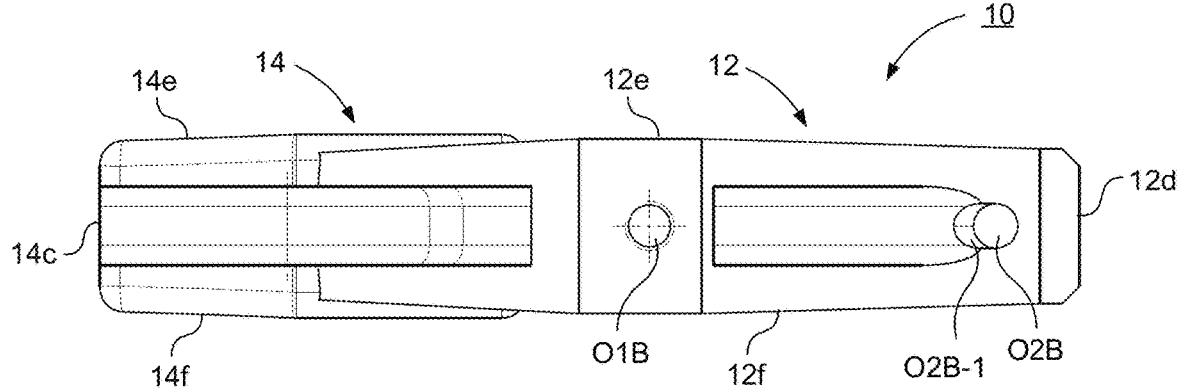
FIG. 11B schematically illustrates an inner plan view of the tooth member in FIG. 11A according to an embodiment of the present disclosure.
Figure 11C:
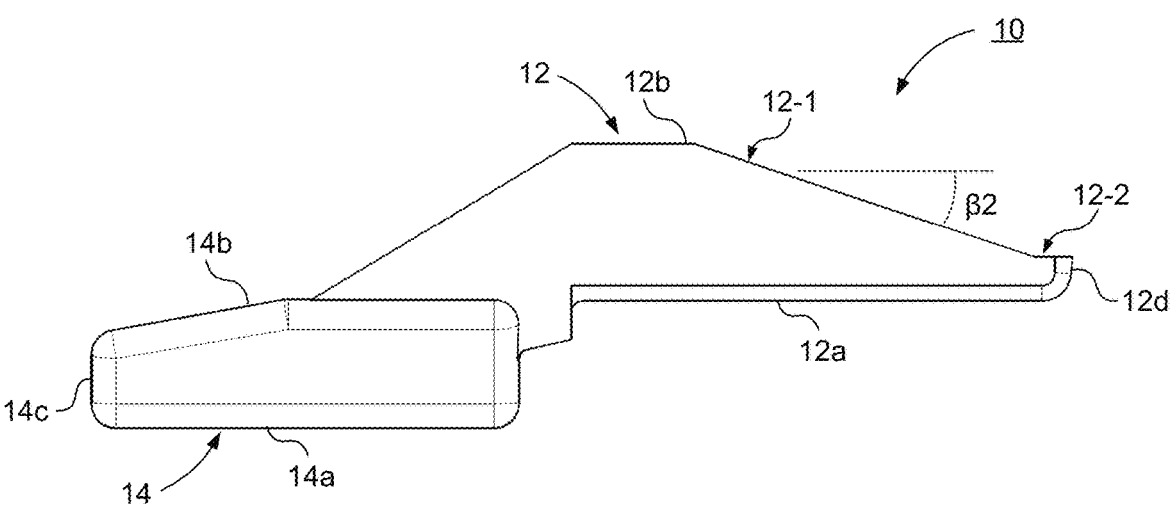
FIG. 11C schematically illustrates a side view of the tooth member in FIG. 11A according to an embodiment of the present disclosure.

FIG. 11A schematically illustrates an outer plan view of a tooth member 10 according to an embodiment of the present disclosure; FIG. 11B schematically illustrates an inner plan view of the tooth member 10 in FIG. 11A according to an embodiment of the present disclosure; FIG. 11C schematically illustrates a side view of the tooth member 10 in FIG. 11A according to an embodiment of the present disclosure; FIG. 12A schematically illustrates a front view of the tooth member 10 in FIG. 11A according to an embodiment of the present disclosure; FIG. 12B schematically illustrates a rear view of the tooth member 10 in FIG. 11A according to an embodiment of the present disclosure; and FIG. 12C schematically illustrates a cross sectional side view of the tooth member 10 in FIG. 12B according to an embodiment of the present disclosure.

Said tooth member 10 comprises a connection portion 12 configured to be connected to the support member 20. Said tooth member 10 further comprises an engagement portion 14 configured to project from the ring-shaped support member 20 so as to engage with said endless track in said operation position.

According to an aspect of the present disclosure, said connection portion 12 is configured to be arranged in connection to said inner side 20b of said support member 20. According to an aspect of the present disclosure, said connection portion 12 is configured to be arranged in connection to said inner side 20b of said support member 20. According to an aspect of the present disclosure, said connection portion 12 is configured to be arranged in connection to be closely received in connection to a recess 22 of said support member when said tooth member is in an operation position for engaging with an endless track when said drive wheel member of a track assembly of a tracked vehicle is connected to the endless track.

According to an aspect of the present disclosure, said connection portion 12 of the tooth member 10 has an outer side 12a providing an outer surface configured to face the inner side 20b of the support member 20, when the tooth member 10 is attached to the support member 20. According to an aspect of the present disclosure, said connection portion 12 of the tooth member 10 has an outer side 12a providing an outer surface configured to face the bottom side 22c of the recess 22 provided on the inner side 20b of the support member 20, when the tooth member 10 is attached to the support member 20. According to an aspect of the present disclosure, said connection portion 12 has an inner side 12b opposite to said outer side 12a.

According to an aspect of the present disclosure, said connection portion 12 of the tooth member 10 has a rear side 12d configured to be arranged in connection to the second end side 20d of the support member 20 when the tooth member 10 is attached to the support member 20, see FIG. 8. According to an aspect of the present disclosure, said rear side 12d of the connection portion 12 constitutes the rear side of the tooth member 10.

According to an aspect of the present disclosure, said connection portion 12 of the tooth member 10 has a first long side 12e configured to run from the rear side 12d towards a front side of the tooth member 10. According to an aspect of the present disclosure, said first long side 12e of the connection portion 12 is configured be arranged in connection to a first inner wall 22a of said recess 22, when the tooth member 10 is attached to the support member 20. According to an aspect of the present disclosure, said first long side 12e of the connection portion 12 is configured to run along and face said first inner wall 22a of said recess 22, when the tooth member 10 is attached to the support member 20 and being in an operation positon.

According to an aspect of the present disclosure, said connection portion 12 of the tooth member 10 has a second long side 12*f* opposite to said first long side 12*e*. According to an aspect of the present disclosure, said second long side 12*f* is configured to run from the rear side 12*d* towards said front side of the tooth member 10. According to an aspect of the present disclosure, said second long side 12*f* of the connection portion 12 is configured be arranged in connection to a second inner wall 22*b* of said recess 22, said second wall 22*b* being opposite to said first wall 22*a*, when the tooth member 10 is attached to the support member 20. According to an aspect of the present disclosure, said second long side 12*f* of the connection portion 12 is configured to run along and face said second inner wall 22*b* of said recess 22, when the tooth member 10 is attached to the support member 20 and being in an operation positon.

According to an aspect of the present disclosure, said connection portion 12 of the tooth member 10 has a first opening O1B configured to run from the outer side 12*a* towards the inner side 12*b*. According to an aspect of the present disclosure, said first opening O1B is configured to run from the outer side 12*a* towards the inner side 12*b* in the radial direction of the drive wheel member, when said tooth member 10 is arranged in the operation position in said recess 22. According to an aspect of the present disclosure, said first opening O1B is configured to run from the outer side 12*a* to and through the inner side 12*b*. According to an aspect of the present disclosure, said first opening O1B is configured to be coaxially arranged relative to an opening O1A running from the outer side 20*a* of the support member 20 and through the bottom 22*c* of the recess 22, when said tooth member 10 is arranged in the operation position in said recess 22. According to an aspect of the present disclosure, said first opening O1B is configured to receive a fastener J1, said fastener according to an aspect being a joint member J1, e.g. a screw joint member, for attaching the tooth member 10 to the support member 20. According to an aspect of the present disclosure, said first opening O1B is arranged relatively close to the first end side 20*c* of said support member 20, when said tooth member 10 is arranged in the operation position in said recess 22. Said joint member is configured to run through said openings O1A, O1B and being configured to attach the tooth member 10, providing a certain resistance requiring a radial force exceeding a certain threshold to overcome. Said first opening O1B is a fastening opening O1B of the connection portion 12 of the tooth member 10.

According to an aspect of the present disclosure, said connection portion 12 of the tooth member 10 has a second opening O2B configured to run from the outer side 12*a* towards the inner side 12*b*. According to an aspect of the present disclosure, said second opening O2B is configured to run from the outer side 12*a* towards the inner side 12*b* in the radial direction of the drive wheel member, when said tooth member 10 is arranged in the operation position in said recess 22. According to an aspect of the present disclosure, said second opening O2B is configured to run from the outer side 12*a* to and through the inner side 12*b*. According to an aspect of the present disclosure, said second opening O2B is configured to be coaxially arranged relative to a fastening opening O2A running from the outer side 20*a* of the support member 20 and through the bottom 22*c* of the recess 22, when said tooth member 10 is arranged in the operation position in said recess 22. According to an aspect of the present disclosure, said second opening O2B is arranged relatively close to the second end side 20*d* of said support member 20, when said tooth member 10 is arranged in the operation position in said recess 22.

According to an aspect of the present disclosure, said second opening O2B is configured to receive a connection member J2 configured to movably connect said tooth member 10 to the support member 20. According to an aspect of the present disclosure, said connection member J2 comprises an attachment portion J2*a* configured to facilitate fixed attachment of said connection member J2 to said fastening opening O2A of said support member 20. According to an aspect of the present disclosure, said connection member J2 comprises a projection portion J2*b* configured to project from the bottom portion 22*c* of said recess 22 in the radial direction in connection to said second end side 20*d*, when said tooth member 10 is arranged in the operation position in said recess 22.

According to an aspect of the present disclosure, said projection portion J2*b* is configured to be received in said second opening O2B when said tooth member 10 is in the operation position. According to an aspect of the present disclosure, said second opening O2B is dimensioned and configured to be engaged with said projection portion J2B such that said tooth member 10 is allowed to pivotably move in the radial direction in connection to said second opening O2B from a position essentially parallel to the centre axis to a position with a certain angle relative to the direction of the centre axis. According to an aspect of the present disclosure, said second opening O2B is dimensioned and configured to be engaged with said projection portion J2B such that said tooth member 10 is essentially prevented to move in a direction of the centre axis Z. According to an aspect of the present disclosure, said second opening O2B is dimensioned and configured to be engaged with said projection portion J2B such that said tooth member 10 is essentially prevented to move in a direction of the longitudinal extension of the recess 22. According to an aspect of the present disclosure, said second opening O2B is dimensioned and configured to be engaged with said projection portion J2B such that said tooth member 10 is essentially prevented to move in a direction away from the first end side 20*c* of the support member 20.

According to an aspect of the present disclosure, said second opening O2B has a first inclination portion O2B-1 in connection to the outer side 12*a* facing towards the rear side 12*d*. Said first inclination portion O2B-1 has an inclination running from the outer side 12*a* towards the inner side 12*b* away from the rear side 12*d*.

According to an aspect of the present disclosure, said second opening O2B has a second inclination portion O2B-2 in connection to the inner side 12*b* facing away from the rear side 12*d*. Said second inclination portion O2B-2 has an inclination running from the inner side 12*b* towards the outer side 12*a* towards the rear side 12*d*.

According to an aspect of the present disclosure, said second opening O2B Said second opening O2B is a detention opening O2B of the connection portion 12 of the tooth member 10.

According to an aspect of the present disclosure, said connection portion 12 of the tooth member 10 has an angled portion 12-1 providing an angled surface portion on the inner side 12*b* so as to facilitate providing a stop at a certain tilted angle of said tooth member when said tooth member is subjected to a radial force exceeding a certain threshold. According to an aspect of the present disclosure, said angled portion 12-1 is configured to run essentially from the first opening O1B towards the rear side 12*d* such that said connection portion 12 is tapering, i.e. narrowing, from a position in connection to said first opening O1B towards the rear side 12d. According to an aspect of the present disclosure, said angled portion has an angle β2 relative to the surface of said outer side 12a.

According to an aspect of the present disclosure, said connection portion 12 of the tooth member 10 comprises a detaining portion 12-2 in connection to the rear side 12d. According to an aspect of the present disclosure, said detaining portion 12-2 is configured to be received in a second end side opening 22O in connection to said second end side 20d of said support member 20 so that radial movement of said received detaining portion 12-2 is essentially prevented by means of a stop portion 22S provided by said end side opening 22O.

According to an aspect of the present disclosure, said engagement portion 14 is configured to project from the first end side 20c of the support member in a direction essentially parallel to the direction of the centre axis Z so as to engage with said endless track, when said tooth member 10, i.e. connection portion 12 of the tooth member 10, is attached to the support member 20, and being in said operation position.

According to an aspect of the present disclosure, said engagement portion 14 of the tooth member 10 has an outer side 14a providing an outer surface configured to face and engage with the inner side of the endless track, when the tooth member 10 is attached to the support member 20 and the drive wheel member is mounted to the tracked vehicle. According to an aspect of the present disclosure, said engagement portion 14 has an inner side 14b opposite to said outer side 14a.

According to an aspect of the present disclosure, said engagement portion 14 of the tooth member 10 has a front side 14c configured to be arranged furthest away from the first end side 20c, facing away from the first end side 20c, when the tooth member 10 is attached to the support member 20, see FIG. 8. According to an aspect of the present disclosure, said front side 14c of the engagement portion 14 constitutes the front side of the tooth member 10.

According to an aspect of the present disclosure, said engagement portion 14 of the tooth member 10 has a first long side 14e configured to run from the front side 14c towards a rear side of the tooth member 10. According to an aspect of the present disclosure, said first long side 14e is configured to run from the front side 14c towards the first end side 20c when the tooth member 10 is attached to the support member 20.

According to an aspect of the present disclosure, said engagement portion 14 of the tooth member 10 has a second long side 14f opposite to said first long side 14e. According to an aspect of the present disclosure, said second long side 14f is configured to run from the front side 14c towards said rear side of the tooth member 10. According to an aspect of the present disclosure, said second long side 14f is configured to run from the front side 14c towards the first end side 20c when the tooth member 10 is attached to the support member 20.

According to an aspect of the present disclosure, each tooth member 10 of said set of tooth members has one or more weight reducing recess portions.

Herein the tooth member described and illustrated comprises a connection portion for connection to the support member and an engagement portion configured to project from the ring-shaped support member so as to engage with said endless track, where said engagement portion is constituted by a single tooth or tooth unit. According to an alternative aspect of the present disclosure, said tooth member could be provided with a connection portion for connection to the support member and an engagement portion configured to project from the ring-shaped support member so as to engage with said endless track, where said engagement portion comprises more than one tooth/tooth unit, e.g. two or three teeth/tooth units.

Below some aspects of the fastening arrangement of a drive wheel member for an endless track of a tracked vehicle according to the present disclosure are listed.

In an aspect, a fastening arrangement of a drive wheel member DW for an endless track E of a tracked vehicle V includes the drive wheel member DW being rotatable about a centre axis Z for rotating said endless track, said drive wheel member DW comprising a hub member H and a drive sprocket member S1, S2, said drive sprocket member comprising a set of tooth members 10 arranged around the circumference of said drive sprocket member S1, S2, said tooth members 10 being configured to engage with said endless track E, said drive sprocket member S1, S2 further comprising a ring-shaped support member 20 for tooth members 10 of said drive sprocket member, said tooth members 10 being configured to be removably attachable to said support member 20, said fastening arrangement being configured for fastening a tooth member 10 of the set of tooth members 10 to the support member 20 so that said tooth member 10 is in an operation position for engaging with said endless track, said fastening arrangement comprising an attachment device configured to detachably attach said tooth member 10 to said support member 20 such that said tooth member is detached from the operation position if said tooth member is subjected to a radial force F exceeding a certain threshold, said radial force F being directed towards the centre axis Z. In an aspect, said tooth member 10 is configured to be detainably arranged such that, if said tooth member 10 is subjected to a radial force exceeding a certain threshold resulting in said detachment from the operation position, said tooth member 10 is detained in connection to said support member 20.

In an aspect, said endless track (E) being configured to run over said drive wheel member when the drive wheel member is mounted to the tracked vehicle, wherein said ring-shaped support member 20 has an outer side 20a configured to face the endless track of the tracked vehicle when the drive wheel member is mounted to the tracked vehicle and an opposite inner side 20b, wherein said tooth member comprises a connection portion 12 configured to be arranged in connection to said inner side 20b of said support member 20 and an engagement portion 14 configured to project from the ring-shaped support member so as to engage with said endless track in said operation position.

In an aspect, said engagement portion is configured to project from the first end side in a direction essentially parallel to the direction of the centre axis so as to facilitate said detachment of said tooth member from the operation position if said tooth member is subjected to a radial force exceeding a certain threshold.

In an aspect, said fastening arrangement further comprises a detaining device J2, 22O, 22S configured to detain said tooth member 10 if said tooth member 10 is subjected to said radial force F exceeding a certain threshold resulting in said detachment from the operation position.

In an aspect, said detaining device J2, 22O, 22S is configured to movably connect said tooth member 10 to said support member 20 such that if said tooth member 10 is subjected to said radial force F exceeding a certain threshold, said tooth member 10 is tiltably moved in the radial direction.

In an aspect, said detaining device is configured to detain said connection portion 12 of said tooth member 10 in connection to said second end side 20*d*, such that if said tooth member 10 is subjected to said radial force F exceeding said certain threshold, said tooth member 10 is tiltably moved in the radial direction from said operation position so that the tooth member 10 is positioned with a certain angle α relative to the direction of the centre axis Z.

In an aspect, said detaining device comprises a detaining member 22O, 22S comprising a second end side opening 22O in connection to said second end side 20*d* and a stop portion 22S provided by said opening 22O, said second end side opening 22O being arranged in connection to and providing an extension of said recess 22, said second end side opening 22O being arranged to receive a detaining portion 12-2 of said connection portion 12, said stop portion 22S preventing movement of said received detaining portion 12-2 in the radial direction towards the centre axis Z.

In an aspect, said detaining device comprises a connection member J2 having a projection portion J2*b* configured to project from the bottom 22*c* of said recess 22 in the radial direction in connection to said second end side 20*d*, said detaining device further comprising an opening O2B arranged in said connection portion 12 of said tooth member 10, said projection portion J2*b* being configured to be received in said opening O2B when said tooth member 10 is in the operation position, said opening O2B being dimensioned and configured to be engaged with said projection portion J2*b* such that if said tooth member 10 is subjected to said radial force F exceeding said certain threshold, said tooth member 10 is allowed to pivotably move in the radial direction in connection to said opening O2B from a position essentially parallel to the centre axis Z to a position with a certain angle relative to the direction of the centre axis Z.

In an aspect, said projection portion J2*b* is configured to essentially prevent movement of said tooth member in the direction of the centre axis Z.

In an aspect, said stop portion 22S has an angled surface portion 22S*a* configured to face towards said connection portion 12 such that if said tooth member 10 is subjected to said radial force F exceeding a certain threshold, said tooth member 10 is allowed to tiltably move in the radial direction to an angled position where said connection portion 12 is stopped towards said angled surface portion 22S*a* of said stop portion 22S.

In an aspect, said ring-shaped support member 20 has first end side 20*c* and an opposite second end side 20*d*, said end sides facing in a direction parallel to the direction of said centre axis Z, wherein said engagement portion is configured to project from the first end side 20*c* in a direction essentially parallel to the direction of the centre axis Z so as to engage with said endless track in said operation position.

In an aspect, said fastening arrangement comprises a recess 22 arranged on said inner side 20*b* of said ring-shaped support member 20 and configured to run between said first end side 20*c* and said opposite second end side 20*d*, said connection portion 12 of said tooth member 10 being configured to be closely received in connection to said recess 22 in said operation position.

In an aspect, said attachment device comprises a fastener J1 configured to connect said tooth member 10 to said support member 20 in said operation position, said fastener J1 being configured to provide a resistance force such that said tooth member 10 remains attached in said operation position if said tooth member 10 is subjected to a radial force not exceeding said certain threshold, and such that said tooth member is detached from the operation position if subjected to said radial force exceeding said certain threshold.

In an aspect, said fastener J1 of said attachment device is configured to attach said connection portion 12 of said tooth member 10 to the recess 22 of said support member 20 in connection to said first end side 20*c*, said recess 22 being open in the radial direction towards said centre axis Z in connection to the first end side 20*c* and at least a certain portion along the way from the first end side towards the second end side 20*d* such that said tooth member 10 is allowed to detach from the operation position if subjected to said radial force F exceeding said certain threshold.

In an aspect, said drive wheel member DW comprising an outer drive sprocket member S1 arranged on the outer side H1 of the hub member H and an inner drive sprocket member S2 arranged on the inner side H2 of the hub member H, the outer side H1 facing out from a vehicle in the transversal direction of the vehicle and the inner side H2 facing towards the vehicle in the transversal direction of the vehicle to which the drive wheel member DW is mounted.

In an aspect, a drive wheel member DW comprises a fastening arrangement according to any aspect.

In an aspect, a tracked vehicle V comprises a fastening arrangement according to any aspect.

Below some further aspects of the fastening arrangement of a drive wheel member for an endless track of a tracked vehicle according to the present disclosure are listed.

In an aspect, a fastening arrangement of a drive wheel member DW for an endless track E of a tracked vehicle V includes the drive wheel member DW being rotatable about a centre axis Z for rotating said endless track, said drive wheel member DW comprising a hub member H and a drive sprocket member S1, S2, said drive sprocket member comprising a set of tooth members 10 arranged around the circumference of said drive sprocket member S1, S2, said tooth members 10 being configured to engage with said endless track E, said drive sprocket member S1, S2 further comprising a ring-shaped support member 20 for tooth members 10 of said drive sprocket member, said tooth members 10 being configured to be removably attachable to said support member 20, said fastening arrangement being configured for fastening a tooth member 10 of the set of tooth members 10 to the support member 20 so that said tooth member 10 is in an operation position for engaging with said endless track, said fastening arrangement comprising an attachment device configured to provide a radially arranged attachment between said tooth member 10 and said support member in said operation position, said attachment device being configured to detachably attach said tooth member 10 to said support member 20 such that said tooth member is detached from the operation position if said tooth member is subjected to a radial force F exceeding a certain threshold, said radial force F being directed towards the centre axis Z.

In an aspect, said endless track being configured to run over said drive wheel member when the drive wheel member is mounted to the tracked vehicle, wherein said ring-shaped support member 20 has an outer side 20*a* configured to face in the radial direction of said support member away from said centre axis and configured to face an inner side E4 of the endless track E of the tracked vehicle when the drive wheel member is mounted to the tracked vehicle and an opposite inner side 20*b* configured to face in the radial direction towards said centre axis Z, wherein said tooth member 10 comprises a connection portion 12 configured to be arranged in connection to said inner side 20*b* of said support member 20 and an engagement portion 14 configured to project from the ring-shaped support member so as to engage with said endless track in said operation position.

In an aspect, said ring-shaped support member 20 has a first end side 20c and an opposite second end side 20d, said end sides facing in a direction parallel to the direction of said centre axis Z, wherein said engagement portion is configured to project from the first end side 20c in a direction essentially parallel to the direction of the centre axis Z so as to engage with said endless track in said operation position.

In an aspect, said engagement portion 14 is configured to project from the first end side 20c in a direction essentially parallel to the direction of the centre axis Z so as to facilitate said detachment of said tooth member 10 from the operation position if said tooth member is subjected to a radial force exceeding said certain threshold.

In an aspect, said fastening arrangement comprises a recess 22 arranged on said inner side 20b of said ring-shaped support member 20 facing in the radial direction towards said centre axis Z and configured to run between said first end side 20c and said opposite second end side 20d, said connection portion 12 of said tooth member 10 being configured to be closely received in connection to said recess 22 in said operation position, said attachment device being configured to provide said radially arranged attachment between said tooth member 10 and said support member 20 by means of a radial connection of said connection portion 12 to said support member 20 at said recess 22.

In an aspect, said attachment device comprises a fastener J1 configured to connect said tooth member 10 to said support member 20 in said operation position, said fastener being configured to have an extension in the radial direction in connection to said support member so as to provide said radially arranged attachment in the operation position, said fastener J1 being configured to provide a resistance force such that said tooth member 10 remains attached in said operation position if said tooth member 10 is subjected to a radial force not exceeding said certain threshold, and such that said tooth member is detached from the operation position if subjected to said radial force exceeding said certain threshold.

In an aspect, said fastener J1 of said attachment device is configured to attach said connection portion 12 of said tooth member 10 to the recess 22 of said support member 20 in connection to said first end side 20c, said recess 22 being open in the radial direction towards said centre axis Z in connection to the first end side 20c and at least a certain portion along the way from the first end side towards the second end side 20d such that said tooth member 10 is allowed to detach from the operation position if subjected to said radial force F exceeding said certain threshold.

In an aspect, said fastener J1 of said attachment device has a projection portion configured to project from the bottom 22c of said recess 22 in the radial direction in connection to said first end side 20c, said attachment device further comprising an opening O1B arranged in said connection portion 12 of said tooth member 10, said projection portion being configured to be received in said opening O1B when said tooth member 10 is in the operation position, said opening O1B being dimensioned and configured to be engaged with said projection portion such that if said tooth member 10 is subjected to said radial force F exceeding said certain threshold, said tooth member 10 is allowed to detach from said projection portion.

In an aspect, said tooth member 10 is configured to be detainably arranged such that, if said tooth member 10 is subjected to a radial force exceeding a certain threshold resulting in said detachment from the operation position, said tooth member 10 is detained in connection to said support member 20.

In an aspect, said fastening arrangement further comprising a detaining device J2, 22O, 22S configured to detain said tooth member 10 if said tooth member 10 is subjected to said radial force F exceeding a certain threshold resulting in said detachment from the operation position.

In an aspect, said detaining device J2, 22O, 22S is configured to movably connect said tooth member 10 to said support member 20 such that if said tooth member 10 is subjected to said radial force F exceeding a certain threshold, said tooth member 10 is tiltably moved in the radial direction.

In an aspect, said detaining device is configured to detain said connection portion 12 of said tooth member 10 in connection to said second end side 20d, such that if said tooth member 10 is subjected to said radial force F exceeding said certain threshold, said tooth member 10 is tiltably moved in the radial direction from said operation position so that the tooth member 10 is positioned with a certain angle α relative to the direction of the centre axis Z.

In an aspect, said detaining device comprises a detaining member 22O, 22S comprising a second end side opening 22O in connection to said second end side 20d and a stop portion 22S provided by said opening 22O, said second end side opening 22O being arranged in connection to and providing an extension of said recess 22, said second end side opening 22O being arranged to receive a detaining portion 12-2 of said connection portion 12, said stop portion 22S preventing movement of said received detaining portion 12-2 in the radial direction towards the centre axis Z.

In an aspect, said detaining device comprises a connection member J2 having a projection portion J2b configured to project from the bottom 22c of said recess 22 in the radial direction in connection to said second end side 20d, said detaining device further comprising an opening O2B arranged in said connection portion 12 of said tooth member 10, said projection portion J2b being configured to be received in said opening O2B when said tooth member 10 is in the operation position, said opening O2B being dimensioned and configured to be engaged with said projection portion J2b such that if said tooth member 10 is subjected to said radial force F exceeding said certain threshold, said tooth member 10 is allowed to pivotably move in the radial direction in connection to said opening O2B from a position essentially parallel to the centre axis Z to a position with a certain angle relative to the direction of the centre axis Z.

In an aspect, said projection portion J2b is configured to essentially prevent movement of said tooth member in the direction of the centre axis Z.

In an aspect, said stop portion 22S has an angled surface portion 22Sa configured to face towards said connection portion 12 such that if said tooth member 10 is subjected to said radial force F exceeding a certain threshold, said tooth member 10 is allowed to tiltably move in the radial direction to an angled position where said connection portion 12 is stopped towards said angled surface portion 22Sa of said stop portion 22S.

In an aspect, said drive wheel member DW comprising an outer drive sprocket member S1 arranged on the outer side H1 of the hub member H and an inner drive sprocket member S2 arranged on the inner side H2 of the hub member H, the outer side H1 facing out from a vehicle in the transversal direction of the vehicle and the inner side H2 facing towards the vehicle in the transversal direction of the vehicle to which the drive wheel member DW is mounted.

In an aspect, a drive wheel member DW comprises a fastening arrangement according to any aspect.

In an aspect, a tracked vehicle V comprises a fastening arrangement according to any aspect.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. A fastening arrangement of a drive wheel member for an endless track of a tracked vehicle, said fastening arrangement comprising an attachment device wherein:

the drive wheel member is rotatable about a center axis for rotating said endless track, said drive wheel member comprising a hub member and a drive sprocket member, said drive sprocket member comprising:

a set of tooth members arranged around the circumference of said drive sprocket member, said tooth members being engaged with said endless track, and a ring-shaped support member for said tooth members of said drive sprocket member, said tooth members being removably attached to said support member, said fastening arrangement fastens a tooth member of the set of tooth members to the support member so that said tooth member is in an operation position for engaging with said endless track, and said attachment device detachably attaches said tooth member to said support member such that said tooth member is detached from the operation position if said tooth member is subjected to a radial force exceeding a certain threshold.

2. The fastening arrangement of claim 1, wherein said ring-shaped support member has an outer side facing the endless track of the tracked vehicle when the drive wheel member is mounted to the tracked vehicle and an opposite inner side, wherein said tooth member comprises a connection portion connected to said inner side of said support member and an engagement portion projecting from the ring-shaped support member so as to engage with said endless track in said operation position.

3. The fastening arrangement of claim 1, wherein said ring-shaped support member has a first end side and an opposite second end side, said first end and opposite second end sides facing in a direction parallel to the direction of said center axis, wherein said engagement portion projects from the first end side in a direction parallel to the direction of the center axis so as to engage with said endless track in said operation position.

4. The fastening arrangement of claim 3, wherein said fastening arrangement comprises a recess arranged on said inner side of said ring-shaped support member and runs between said first end side and said opposite second end side, said connection portion of said tooth member being received in said recess in said operation position.

5. The fastening arrangement of claim 1, wherein said attachment device comprises a fastener to connect said tooth member to said support member in said operation position, said fastener provides a resistance force such that said tooth member remains attached in said operation position if said tooth member is subjected to a radial force not exceeding said certain threshold, and such that said tooth member is detached from the operation position if subjected to said radial force exceeding said certain threshold.

6. The fastening arrangement of claim 1, wherein said tooth member is detainably arranged such that, if said tooth member is subjected to a radial force exceeding said certain threshold resulting in said detachment from the operation position, said tooth member is detained.

7. The fastening arrangement of claim 1, wherein said fastening arrangement further comprising a detaining device to detain said tooth member if said tooth member is subjected to said radial force exceeding said certain threshold resulting in said detachment from the operation position.

8. The fastening arrangement of claim 7, wherein said detaining device movably connects said tooth member to said support member such that if said tooth member is subjected to said radial force exceeding said certain threshold, said tooth member is tiltably moved in the radial direction.

9. The fastening arrangement of claim 4, wherein said fastener of said attachment device attaches said connection portion of said tooth member to the recess of said support member, said recess being open in the radial direction towards said center axis such that said tooth member is allowed to detach from the operation position if subjected to said radial force exceeding said certain threshold.

10. The fastening arrangement of claim 4, wherein said detaining device detains said connection portion of said tooth member such that if said tooth member is subjected to said radial force exceeding said certain threshold, said tooth member is tiltably moved in the radial direction from said operation position so that the tooth member is positioned with a certain angle relative to the direction of the center axis.

11. The fastening arrangement of claim 4, wherein said detaining device comprises a detaining member comprising a second end side opening and a stop portion provided by said opening, said second end side opening providing an extension of said recess, said second end side opening being arranged to receive a detaining portion of said connection portion, said stop portion preventing movement of said received detaining portion in the radial direction towards the center axis.

12. The fastening arrangement of claim 10, wherein said detaining device comprises a connection member having a projection portion projecting from the bottom of said recess in the radial direction, said detaining device further comprising an opening arranged in said connection portion of said tooth member, said projection portion being received in said opening when said tooth member is in the operation position, said opening being engaged with said projection portion such that if said tooth member is subjected to said radial force exceeding said certain threshold, said tooth member is allowed to pivotably move in the radial direction from a position parallel to the center axis to a position with a certain angle relative to the direction of the center axis.

13. The fastening arrangement of claim 12, wherein said projection portion prevents movement of said tooth member in the direction of the center axis.

14. The fastening arrangement of claim 11, wherein said stop portion has an angled surface portion facing towards said connection portion such that if said tooth member is subjected to said radial force exceeding said certain threshold, said tooth member is allowed to tiltably move in the radial direction to an angled position where said connection portion is stopped towards said angled surface portion of said stop portion.

15. The fastening arrangement of claim 1, wherein said drive wheel member comprising an outer drive sprocket member arranged on the outer side of the hub member and an inner drive sprocket member arranged on the inner side of the hub member, the outer side facing out from a vehicle in the transversal direction of the vehicle and the inner side facing towards the vehicle in the transversal direction of the vehicle to which the drive wheel member is mounted.

16. A drive wheel member comprising the fastening arrangement of claim 1.

17. A tracked vehicle comprising the fastening arrangement of claim 1.

\* \* \* \* \*